US012676463B2

(12) United States Patent
Witherbee et al.

(10) Patent No.: US 12,676,463 B2
(45) Date of Patent: Jul. 7, 2026

(54) ADJUSTABLE-DEPTH RING ASSEMBLY

(71) Applicant: Eaton Intelligent Power Limited,
Dublin (IE)

(72) Inventors: Martin L. Witherbee, Godfrey, IL
(US); Shane A. Semple, Canonsburg,
PA (US)

(73) Assignee: **EATON INTELLIGENT POWER
LIMITED,** Dublin (IE)

( * ) Notice: Subject to any disclaimer, the term of this
patent is extended or adjusted under 35
U.S.C. 154(b) by 179 days.

(21) Appl. No.: 18/529,499

(22) Filed: Dec. 5, 2023

(65) Prior Publication Data

US 2024/0186778 A1     Jun. 6, 2024

Related U.S. Application Data

(60) Provisional application No. 63/386,000, filed on Dec.
5, 2022.

(51) Int. Cl.
H02G 3/08 (2006.01)
H02G 3/12 (2006.01)

(52) U.S. Cl.
CPC ............. H02G 3/081 (2013.01); H02G 3/123
(2013.01)

(58) Field of Classification Search
CPC .......... H02G 3/08; H02G 3/081; H02G 3/123;
H02G 3/14

USPC ........................................................ 174/66
See application file for complete search history.

(56) References Cited

U.S. PATENT DOCUMENTS

| | | | |
|---|---|---|---|
| 5,931,325 | A | 8/1999 | Filipov |
| 6,820,760 | B2 | 11/2004 | Wegner et al. |
| 7,189,928 | B2 | 3/2007 | Denier |
| 7,276,661 | B2 | 10/2007 | Wegner et al. |
| 7,410,072 | B2 | 8/2008 | Wegner et al. |
| 7,468,486 | B2 | 12/2008 | Yan |
| 7,531,583 | B2 | 5/2009 | Desai |
| 7,572,977 | B2 | 8/2009 | Gorman |
| 7,637,385 | B2 | 12/2009 | Wegner et al. |
| 2022/0158431 | A1* | 5/2022 | Johnson ................... H02G 3/14 |

* cited by examiner

*Primary Examiner* — Tremesha W Burns
(74) *Attorney, Agent, or Firm* — Stinson LLP

(57) ABSTRACT

The present disclosure provides an adjustable-depth ring
assembly including a cover plate, an extension ring, and at
least one pair of tabs. The cover plate includes a planar rigid
plate and a raised portion. The raised portion projects
laterally from the rigid plate and defines an opening. The
extension ring defines a cavity and is sized for reception in
the opening of the cover plate. The extension ring is movable
relative to the cover plate along an axis extending in
front-to-back direction such that an axial distance between a
front of the extension ring and the cover plate can be
adjusted. Each tab of the pair of tabs defines an opening for
mounting an electrical device to the extension ring. The pair
of tabs extends laterally from the extension ring such that a
line segment connects centers of the openings of the pair of
tabs.

18 Claims, 34 Drawing Sheets

32

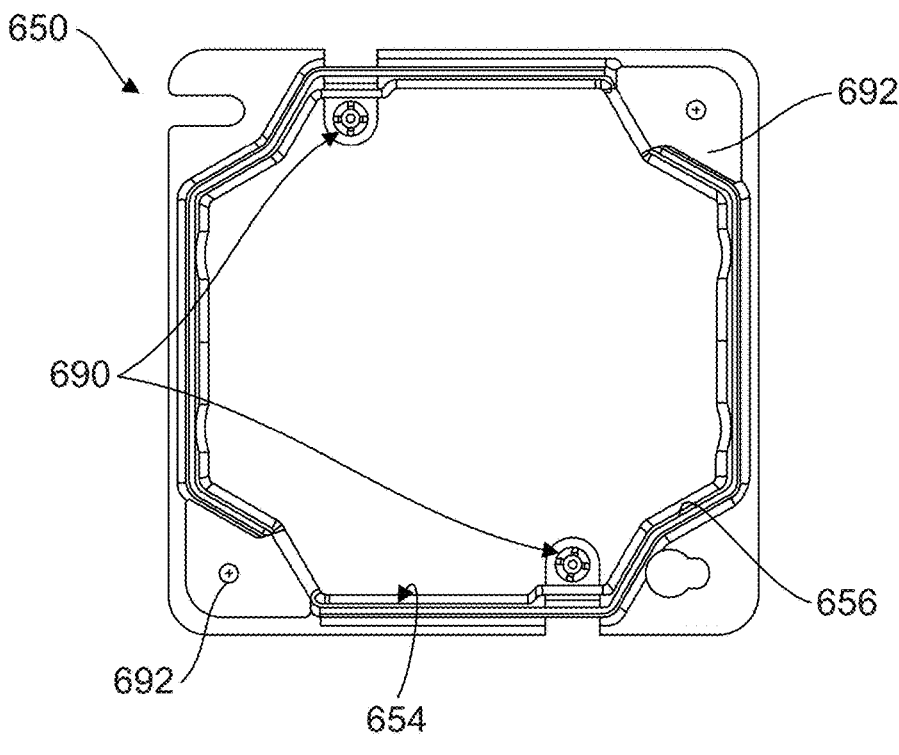
FIG. 32A
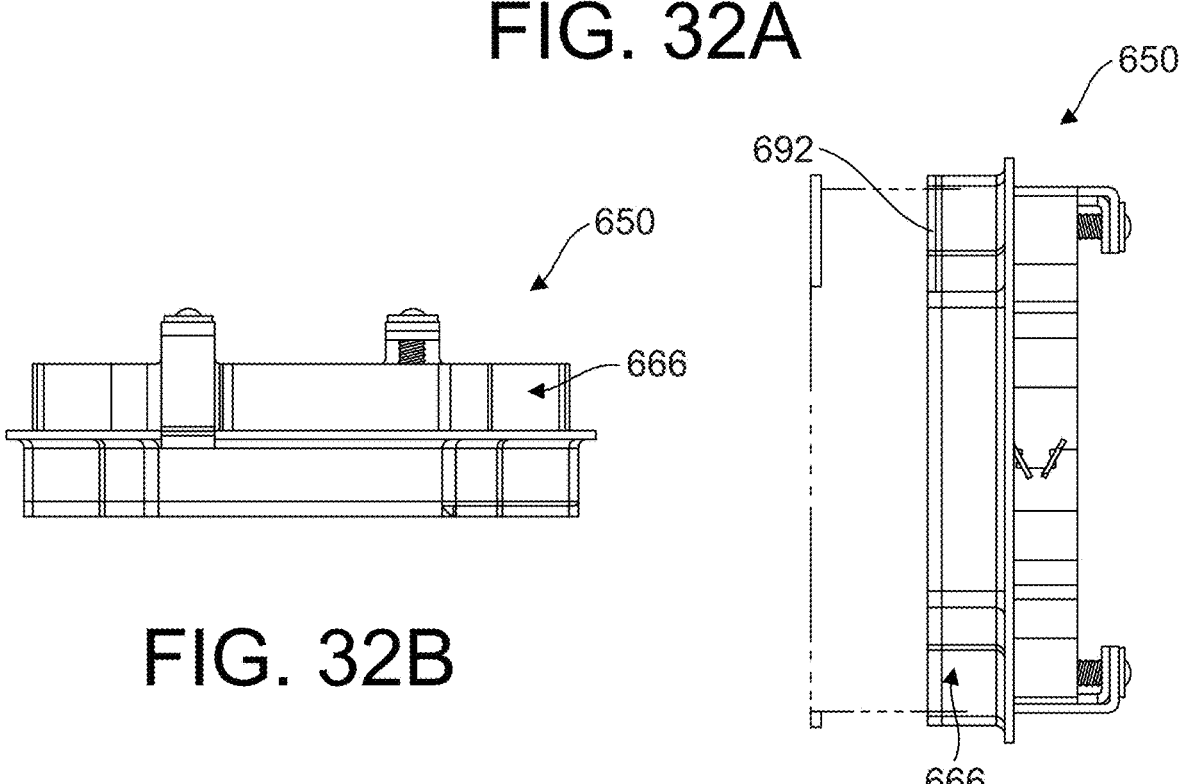
FIG. 32B
FIG. 32C

ADJUSTABLE-DEPTH RING ASSEMBLY

CLAIM OF PRIORITY

This application claims the benefit of U.S. Provisional Patent Application Ser. No. 63/386,000, filed on Dec. 5, 2022, the entire content is hereby incorporated by reference.

FIELD

The present invention generally relates to the installation of electrical devices in an electrical junction box mounted in a wall.

BACKGROUND

The conventional process for installing an electrical device, e.g., a light switch, outlet, or telephone/computer jack, in a junction box involves mounting the junction box on a wall stud before the drywall is installed, mounting the electrical device on a box cover plate (often referred to as a "mud ring"), connecting the wiring of the device to the wiring in the junction box, securing the box cover plate and the device to the junction box, and attaching a cover plate to the electrical device to cover and protect the assembly. The drywall (or other type of wall) is installed at a later time, sometimes days or even weeks or months later. An opening is cut in the drywall to reveal the electrical device.

The above process has drawbacks. For example, if the thickness of the drywall is changed after installation of the electrical device, the mud rings must be replaced. Further, the electrical device must be installed at an early stage of the process, even though there may be a substantial delay before the installation process is finally finished. The purchase of materials, including expensive electrical devices, long before they are actually ready for use is undesirable from the standpoint of cash flow, especially where a job requires many such devices. Also, there may be design changes after the dry wall is installed, such as a change in the type of finish cover plate to be used, which can affect the configuration of the electrical device. There is also a risk of damage to the electrical device prior to and during installation and trim-up of the dry wall. In such cases the installed electrical device may have to be replaced by a substitute device, which is a costly process. Attempts have been made to solve some of these problems by using adjustable-depth mud rings and junction boxes, as described for example, in U.S. Pat. Nos. 7,572,977, 7,531,583, 7,468,486, 7,189,928, 6,820,760, and 5,931,325. However, the adjustability of these components does not address all of the problems arising from last-minute design changes and/or a substantial delay between the time the electrical devices are installed and the time they are actually ready to use, nor the risk of damage to the electrical device prior to completion of the drywall installation and trim-up process.

SUMMARY

In one aspect, the present disclosure provides an adjustable-depth ring assembly for connection to an electrical box that is accessible through a structure opening in a structure disposed forward of the electrical box. The assembly comprises a cover plate, extension ring, first pair of tabs, and a second pair of tabs. The cover plate is configured for attachment to the electrical box and includes a planar rigid plate and a raised portion. The raised portion projects laterally from the rigid plate and defines an opening. The extension ring defines a cavity and is sized for reception in the opening of the cover plate to couple the extension ring to the cover plate. The extension ring is movable relative to the cover plate along an axis extending in front-to-back direction such that an axial distance between a front of the extension ring and the cover plate can be adjusted to accommodate structures of different thicknesses. Each tab of the first pair of tabs defines an opening for mounting an electrical device to the extension ring. The first pair of tabs extends laterally from the extension ring such that a line segment connects centers of the openings of the first pair of tabs. Each tab of the second pair of tabs defines an opening for mounting an electrical device to the extension ring. The second pair of tabs extends laterally from the extension ring such that a line segment connects centers of the openings of the second pair of tabs. The line segments connecting the centers of the openings in each pair of tabs intersects at a center of the ring.

In another aspect, the present disclosure provides an alternative adjustable-depth ring assembly for connection to an electrical box that is accessible through a structure opening in a structure disposed forward of the electrical box. The assembly comprises a cover plate, an extension ring, and a pair of tabs. The cover plate is configured for attachment to the electrical box. The cover plate includes a planar rigid plate and a raised portion. The raised portion projects laterally from the rigid plate and defines an opening. The extension ring defines a cavity and is sized for reception in the opening of the cover plate to couple the extension ring to the cover plate. The extension ring is movable relative to the cover plate along an axis extending in front-to-back direction such that an axial distance between a front of the extension ring and the cover plate can be adjusted to accommodate wall members of different thicknesses. Each tab of the pair of tabs defines an opening for mounting an electrical device to the extension ring. The pair of tabs extends laterally outward from the extension ring, and a line segment connecting centers of the openings of the first pair of tabs intersects a center of the extension ring.

In another aspect, the present disclosure provides an alternative adjustable-depth ring assembly for connection to an electrical box that is accessible through a structure opening in a structure disposed forward of the electrical box. The assembly comprises a cover plate, an extension ring, and a pair of tabs. The cover plate is configured for attachment to the electrical box. The cover plate includes a planar rigid plate and a raised portion. The raised portion projects laterally from the rigid plate and defines an opening. The extension ring defines a cavity and is sized for reception in the opening of the cover plate to couple the extension ring to the cover plate. The extension ring is movable relative to the cover plate along an axis extending in front-to-back direction such that an axial distance between a front of the extension ring and the cover plate can be adjusted to accommodate wall members of different thicknesses. Each tab of the pair of tabs defines a proximal opening and a distal opening for mounting an electrical device to the extension ring. The pair of tabs extends laterally from the extension ring such that a first line segment connects centers of the proximal openings of the pair of tabs and a second line segment connects centers of the distal openings of the pair of tabs such that the second line segment is greater than the first line segment.

Other aspects will be in part apparent and in part pointed out hereinafter.

BRIEF DESCRIPTION OF THE DRAWINGS

FIG. 32A is a front view of the adjustable-depth ring assembly of FIG. 30 in the retracted configuration;

FIG. 32B is a top view of the adjustable-depth ring assembly of FIG. 32A;

FIG. 32C is a side view of the adjustable-depth ring assembly of FIG. 32A;

Corresponding reference characters indicate corresponding parts throughout the drawings.

DETAILED DESCRIPTION

Figure 1:
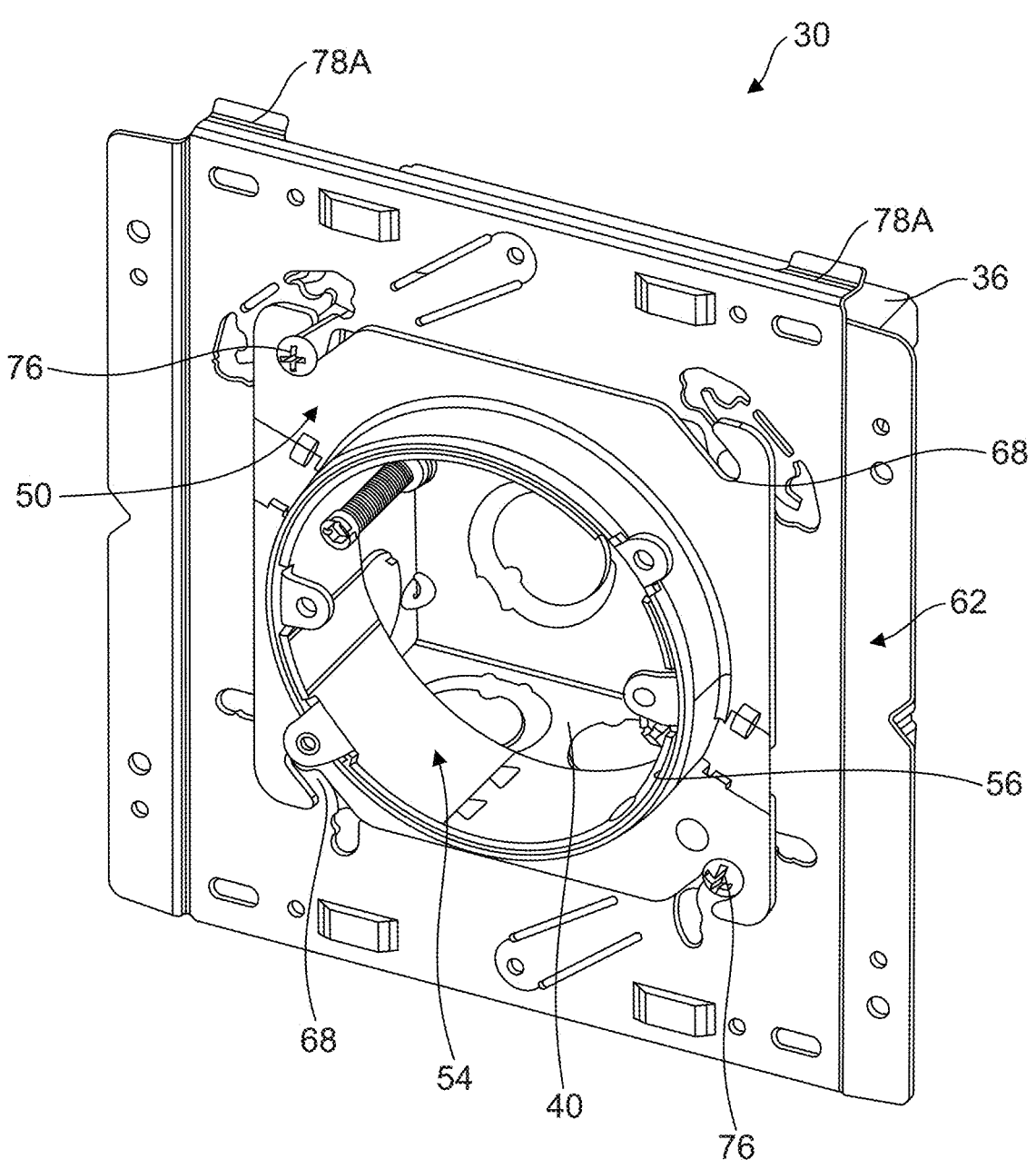
FIG. 1 is a front perspective view of an adjustable-depth ring assembly secured on an electrical box.
Figure 2:
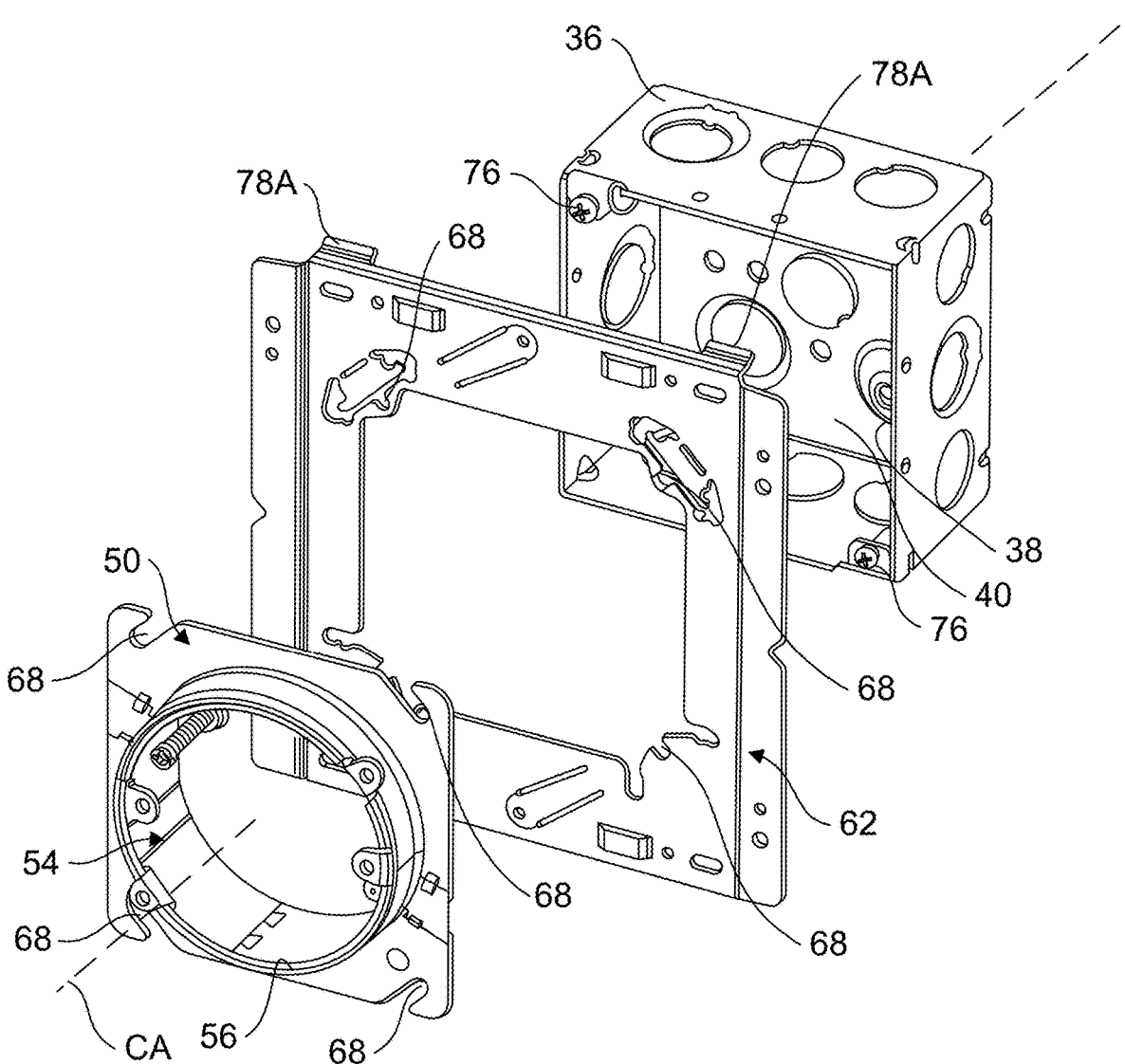
FIG. 2 is an exploded view of the adjustable-depth ring assembly and electrical box of FIG. 1.
Figure 3:
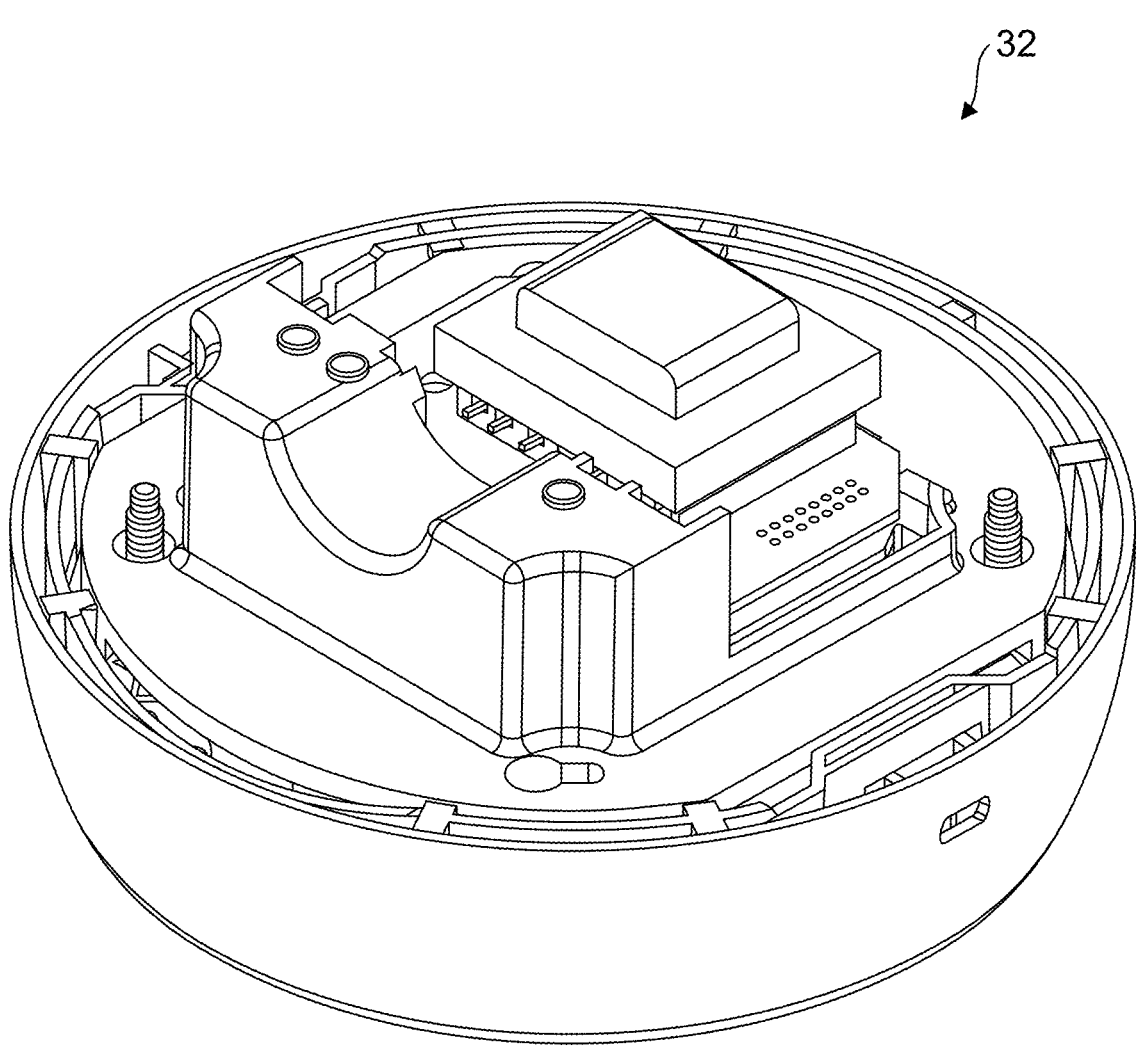
FIG. 3 is a back perspective view of an electrical device for use with an adjustable-depth ring assembly.
Figure 4:
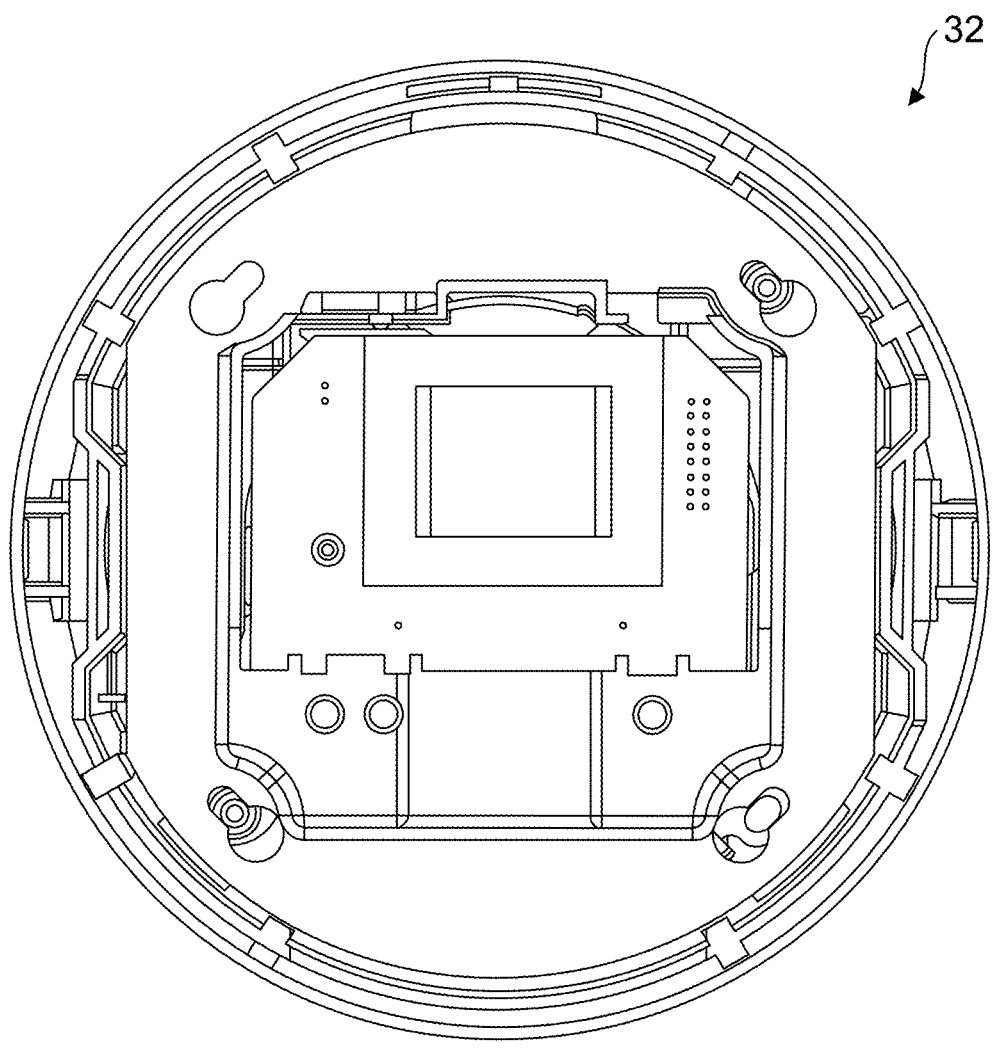
FIG. 4 is a back view of an electrical device of FIG. 3.

Referring to FIGS. 1-2, an adjustable-depth ring assembly of this disclosure, generally designated 30. The assembly 30 is used for mounting an electrical device 32 (See FIGS. 3 and 4) such as a safety device, light fixture, etc., to an electrical junction box 36 (hereinafter referred to as an electrical box, or junction box, or simply box) that is accessible through a structure opening in a structure (not shown) disposed forward of the box. The structure may be a wall, ceiling, or other suitable location. The electrical box 36 has a front opening 38 (FIG. 2) and a cavity 40 (FIGS. 1-2) that are sized for receiving electrical devices 32 (FIGS. 3-4). The box 36 is generally rectangular as illustrated but may have other shapes.

Figure 21:
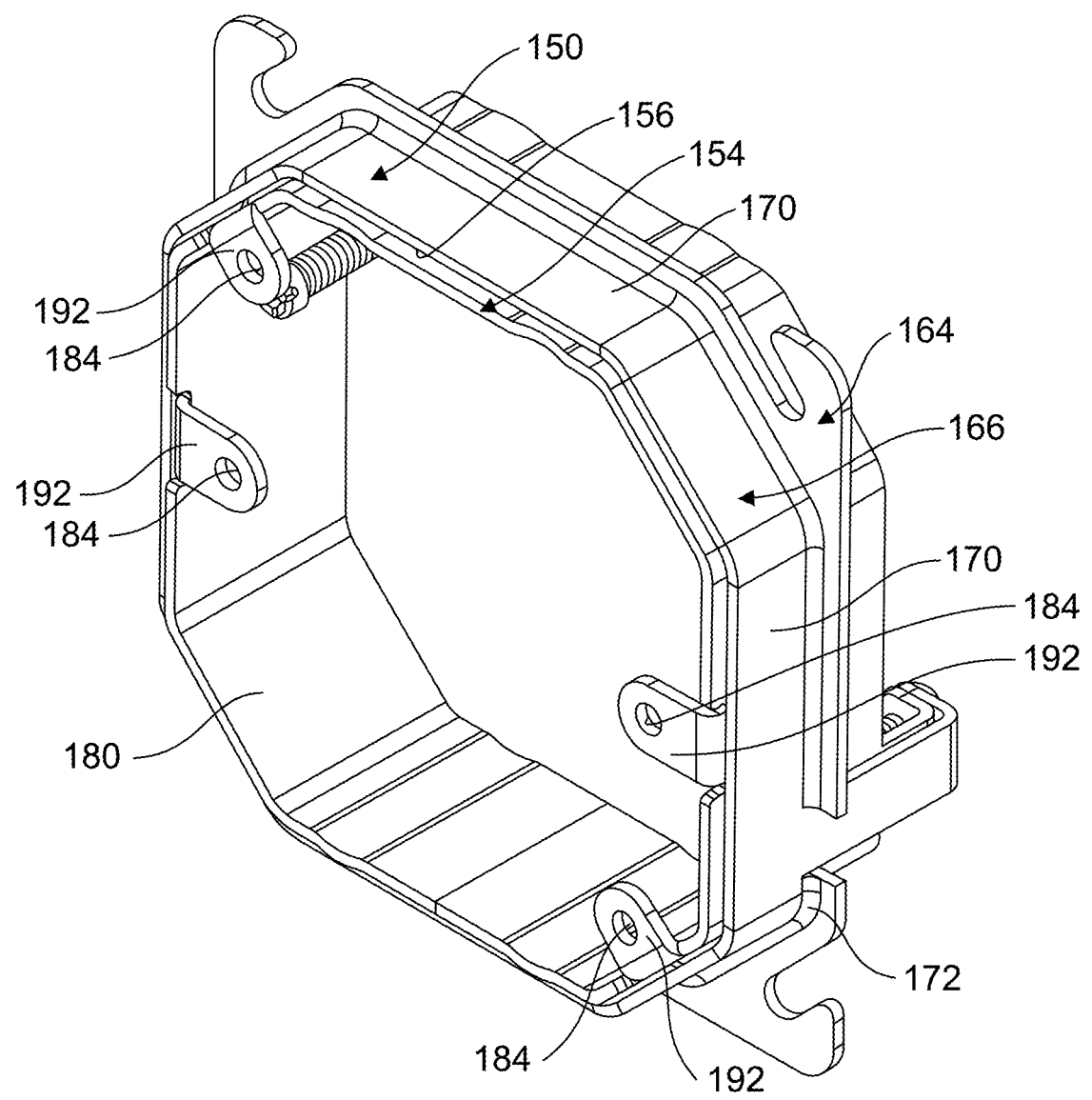
FIG. 21 is a front perspective view of another embodiment of an adjustable-depth ring assembly.

In general, referring to FIGS. 1-2, the adjustable-depth ring assembly 30 comprises a box cover plate 50 sized to fit the electrical box 36 and an extension ring 54 received in a central opening 56 of the box cover plate. The extension ring 54 is movable in the central opening 56 relative to the box cover plate 50 along a central axis CA (FIG. 2) extending in a front-to-back direction such that an axial distance between a front 58 of the extension ring and the box cover plate can be adjusted to accommodate wall members of different thicknesses. Referring to FIGS. 1-2 and 5-15, the extension ring 54 is coupled to the box cover plate 50 such that the extension ring may move or resist movement in a forward direction away from an installed position and may move or resist movement in a rearward direction towards the installed position. (As used herein, movement in the "forward" direction is movement along axis CA toward the left in FIG. 2 and movement in the "rearward" direction is movement along axis CA toward the right in FIG. 2.) Each of the elements of the assembly 30 and its operation are described below. Throughout this application, each change in embodiment will have corresponding reference numbers to the adjustable-depth ring assembly 30 plus 100 for similar features (e.g., adjustable-depth ring assembly 130 in FIGS. 21-22, adjustable-depth ring assembly 230 in FIGS. 23-24, adjustable-depth ring assembly 330 in FIG. 25, adjustable-depth ring assembly 430 in FIGS. 26-27, adjustable-depth ring assembly 530 in FIGS. 28-29, and adjustable-depth ring assembly 630 in FIGS. 30-34.

Figure 18:
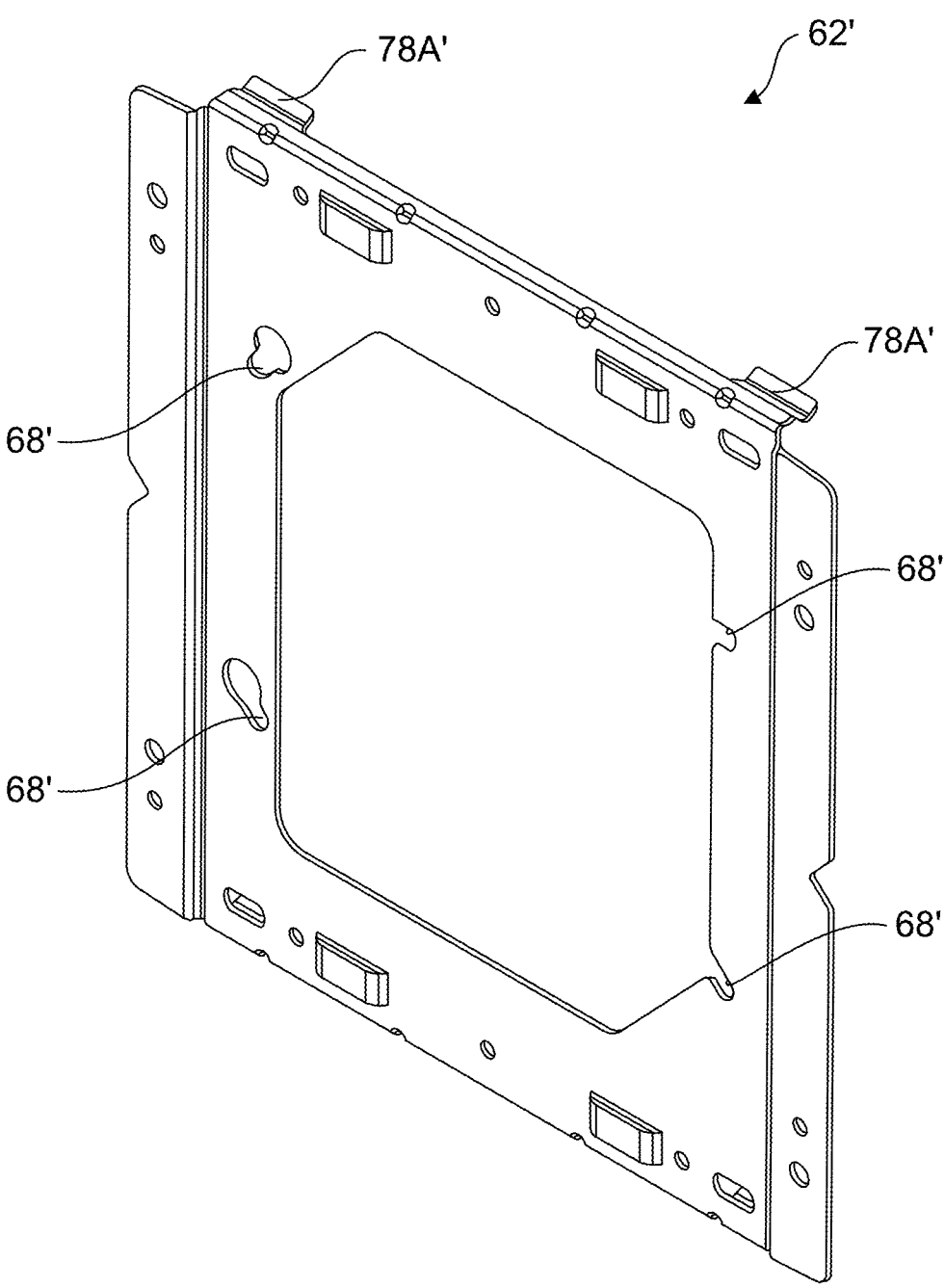
FIG. 18 is a front perspective view of an alternative mounting plate.
Figure 19:
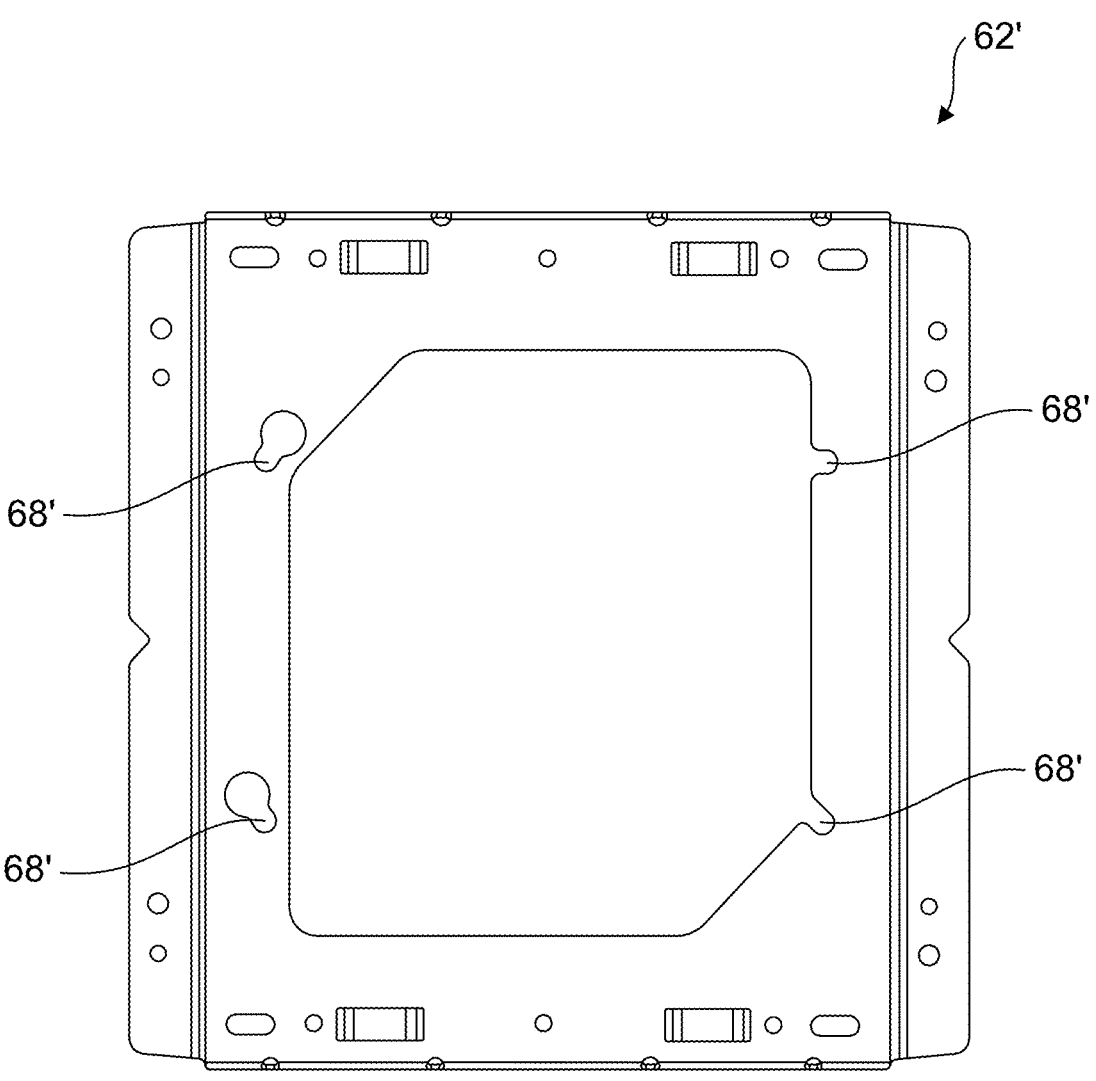
FIG. 19 is a front view of the mounting bracket of FIG. 18.
Figure 20:
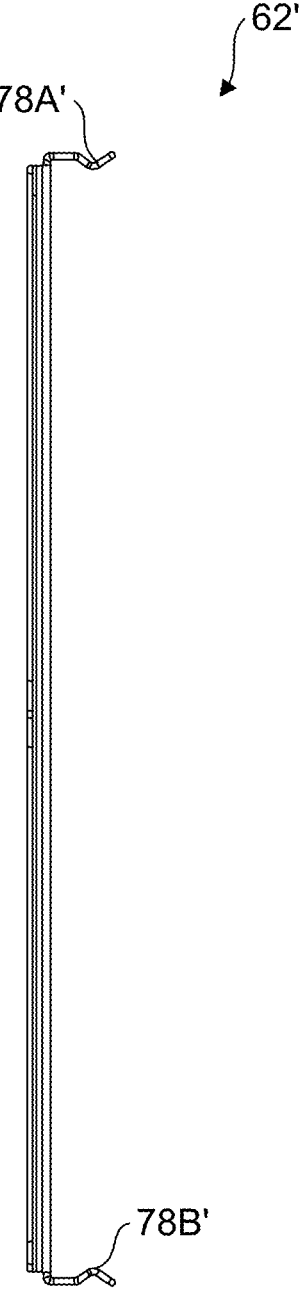
FIG. 20 is a side view of the mounting bracket of FIG. 18.

Referring to FIGS. 1-2 and 15-17, the box cover plate 50 (FIGS. 1-2) is secured to a mounting bracket 62 to operably mount the box cover plate to the electrical box 36. In an alternative embodiment, the box cover plate 50 may be integrally formed with the mounting bracket 62, or the mounting bracket 62 may be omitted, such that the box cover plate directly mounts on the electrical box 36. Referring to FIGS. 1 and 2, the box cover plate 50 and the mounting bracket 62 have fastener openings 68 around its periphery for receiving fasteners 76 (FIG. 1) to fasten the box cover plate to the mounting bracket and electrical box 36. The number, shape and configuration of these openings can vary. When coupled together, at least a portion of a cavity defined by the central opening 56 of the box cover plate 50 and a cavity defined by a central opening of the mounting bracket 62 align. Size and shape of the central opening 56 of the box cover plate may vary without departing from the present disclosure. For example, FIGS. 18-19 show the mounting bracket 62' with a different shape of the central opening than the rear cover plate 62 of FIG. 16. Referring to FIGS. 1-2 and 16-20, embodiments of the mounting bracket 62, 62' include a clip portion 78A, 78A' projecting from a top portion of the rear cover plate and a clip portion 78B, 78B' (FIGS. 17 and 20) projecting from a bottom portion of the rear cover plate. The clips 78A, 78A', 78B, 78B' may extend over top and bottom surfaces of the electrical box 36 while the fasteners 76 secure the box cover plate 50 and mounting bracket to the electrical box 36. Other ways to secure the box cover plate 50 to the electrical box 36 may be incorporated without departing from the scope of the present disclosure. The box cover plate 50 is coupled to the electrical box 36 to operably allow the extension ring 54 to be secured in a rearward direction relative to the box cover plate to an installed position in which the front 58 of the extension ring is generally flush with a front surface of a wall member (not shown). However, it will be understood that the extension ring 54 could be otherwise positioned during installation without departing from the scope of the disclosure.

Figure 6:
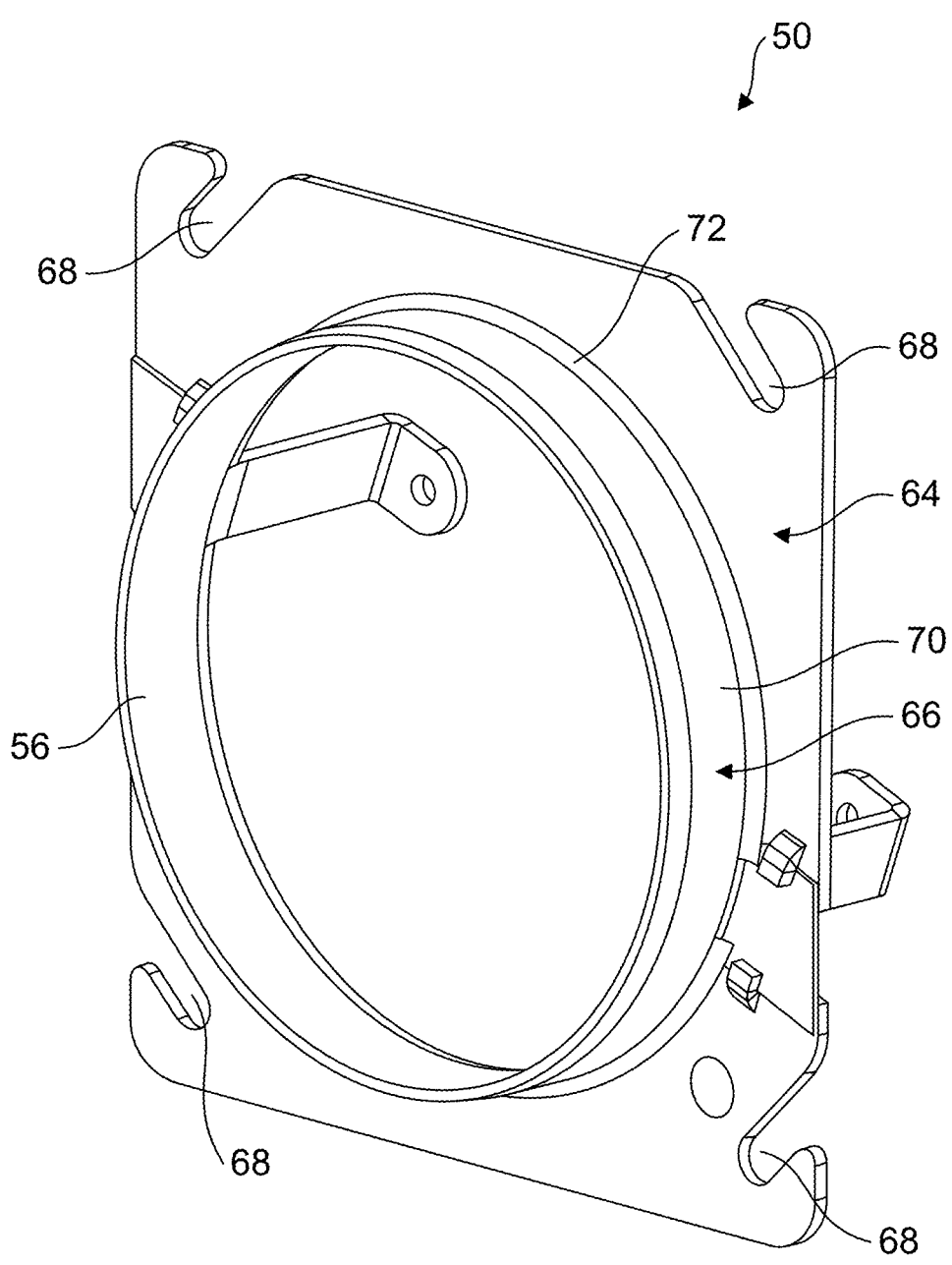
FIG. 6 is a front perspective view of a box cover plate of an adjustable-depth ring of the adjustable-depth ring assembly of FIG. 1.

Referring to FIG. 6, the box cover plate 50 includes a flat generally planar rigid plate 64 of suitable material (e.g., metal) and a raised portion 66 projecting laterally from the rigid plate and defining the central opening 56. The central opening 56 in the cover plate 50 is generally defined by the raised portion 66, and may have a rectangular, round, or octagonal shape and size that generally matches or is smaller than the center opening in the mounting bracket 62 and the front opening 38 of the electrical box 36 (FIG. 2). In the illustrated embodiment, the raised portion 66 is formed integrally with the planar rigid plate 64. However, the raised portion 66 could be separate from the planar rigid plate 64 and suitably attached thereto. In the illustrated embodiment, the raised portion 66 has a shape such as a circle (FIG. 6) or a polygon (FIGS. 21-33) and is defined by at least one wall 70 projecting laterally from the planar rigid plate 64. In the embodiments having a plurality of walls, referring to FIGS. 21-33, walls 170, 270, 320 470, 570, 670, are oriented such that raised portions 166, 266, 366, 466, 566, 666 may be a generally polygonal shaped such as a dodecagon shape (e.g., raised portion 666 in FIGS. 30-33), a pentagon shape (e.g., raised portion 366 in FIG. 25), or an octagon shape (e.g., raised portions 166, 266, 466, 566 in FIGS. 21-24 and 26-29). Other shapes may very without departing from the present disclosure. The wall 70 includes a curved portion 72 that extends directly from the planar rigid plate 64 and a sleeve portion 74 that extends from the curved portion. In one embodiment, the curved portion 72 is concave. The curved portion 72 positions the sleeve portion 74 such that the sleeve portion extends generally orthogonally to the planar rigid plate 64. Additionally, in an embodiment with a plurality of walls 70, each wall may be contiguous with an adjacent wall, defining rounded corners between the walls. Thus, the curved portions 72 of the walls 70 define a continuous track extending around the central opening 56. Referring to FIGS. 21-31, in embodiments having a plurality of walls 170, 270, 370, 470, 570, 670, the walls may be oriented such that the walls generally connect to adjacent walls in a planar manner (FIGS. 21-22, 25-27, and 30-31) or may connect to adjacent walls in a bowed manner (FIGS. 23-23 and 28-29). In alternative embodiments, walls could define straight (e.g., right angle) corners without departing from the scope of the disclosure.

Figure 33:
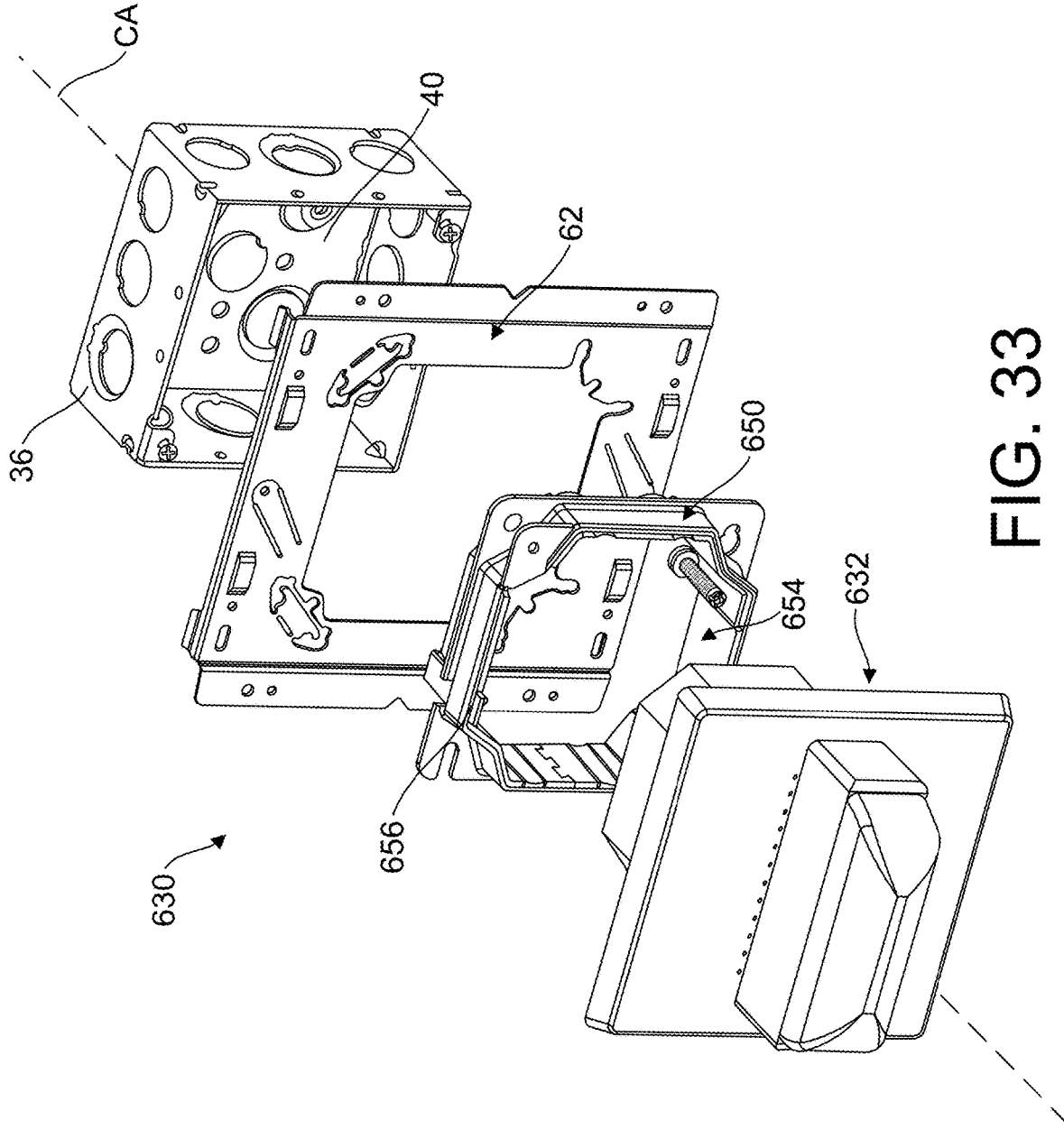
FIG. 33 is an exploded view of an electrical device, the adjustable-depth ring assembly of FIG. 30, and electrical box of FIG. 2.
Figure 34:
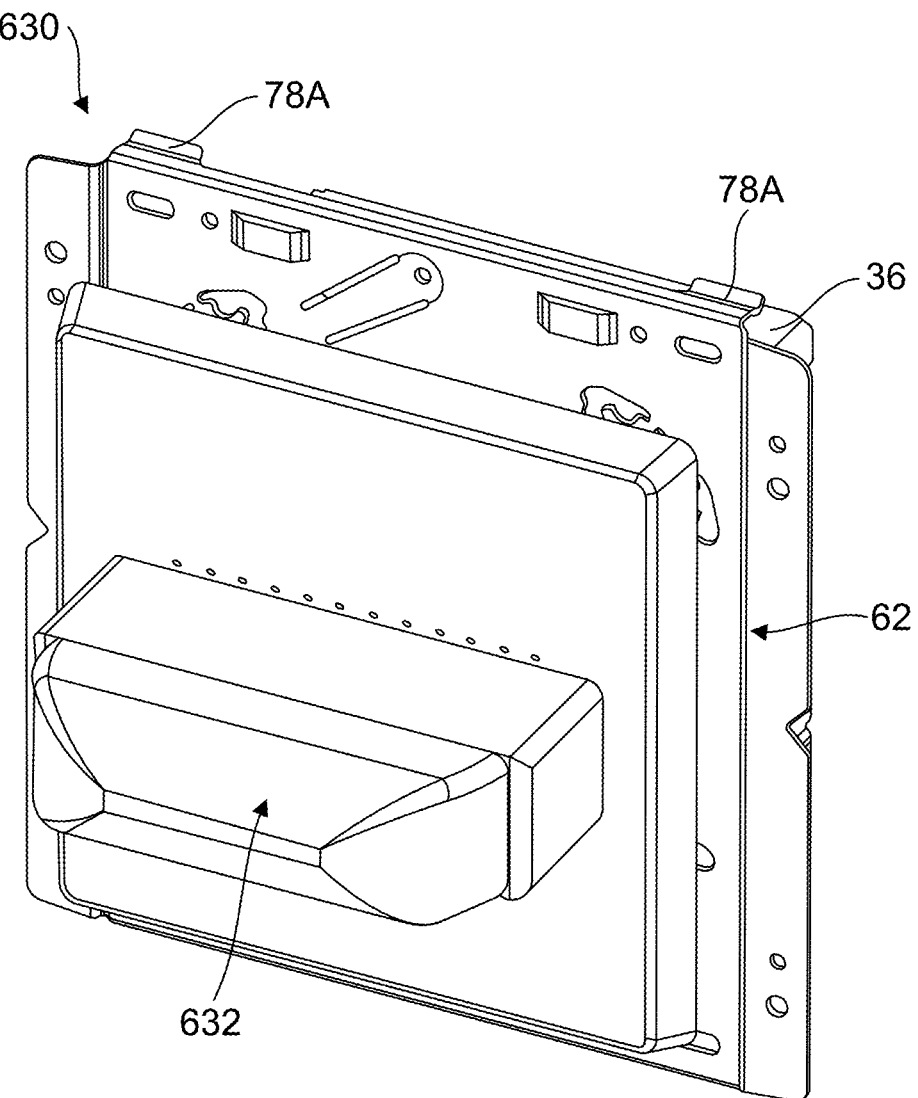
FIG. 34 is a front perspective view of the adjustable-depth ring assembly of FIG. 33 secured to the electrical box and attaching the electrical device to the electrical box.

Referring to FIGS. 30-34, the embodiment with the raised portion 666 being dodecagon shaped is configured to receive an extension ring 654 and an electrical device 632 having a rear portion with an octagon shape (FIG. 33). It will be understood in this regard that the box cover plate 50, and extension ring 54, can be sized for one electrical device or multiple electrical devices (e.g., two, three, four or more) depending on the size and wiring configuration of the electrical box 36.

Figure 9:
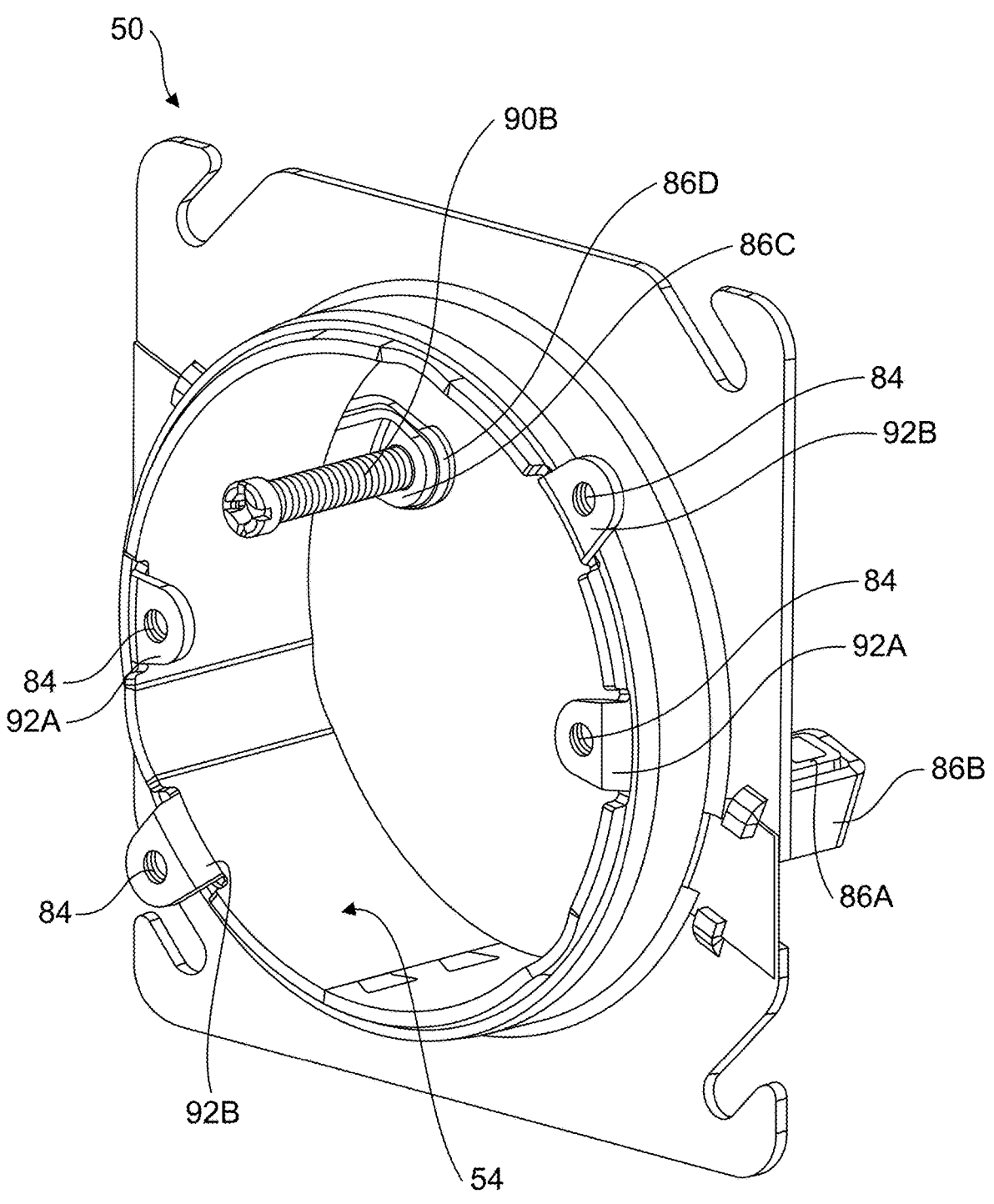
FIG. 9 is a front perspective of the adjustable-depth ring assembly of FIG. 1 with adjustment fasteners in a retracted configuration.
Figure 10:
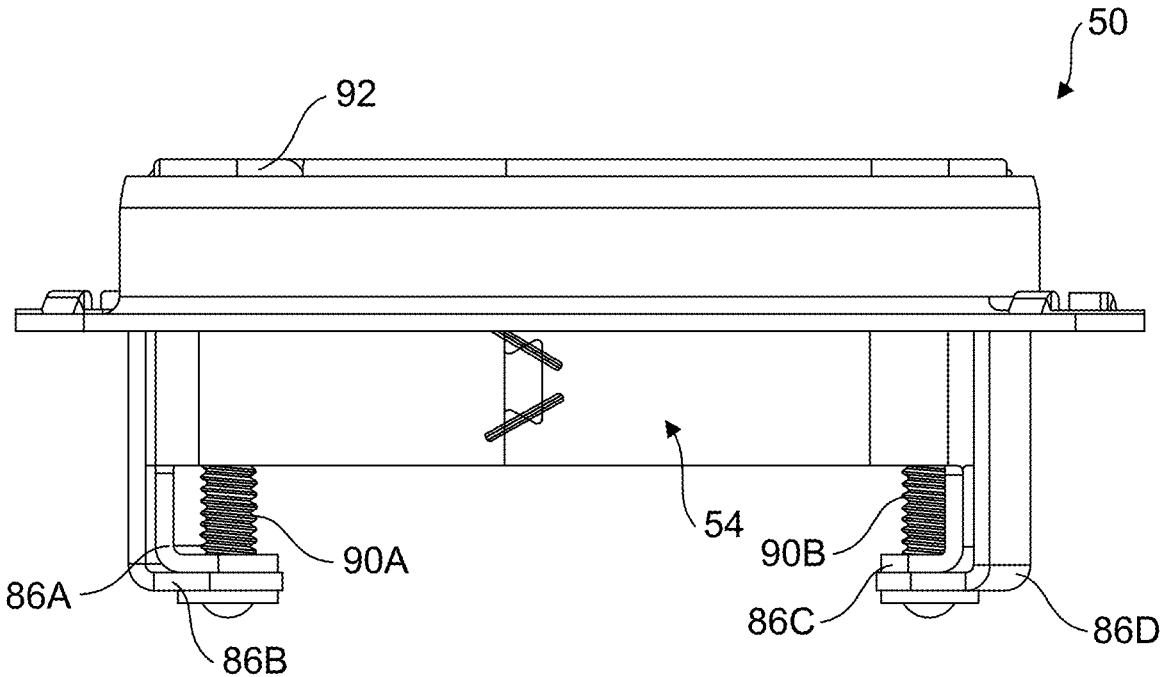
FIG. 10 is a bottom view of the adjustable-depth ring assembly of FIG. 9.
Figure 11:
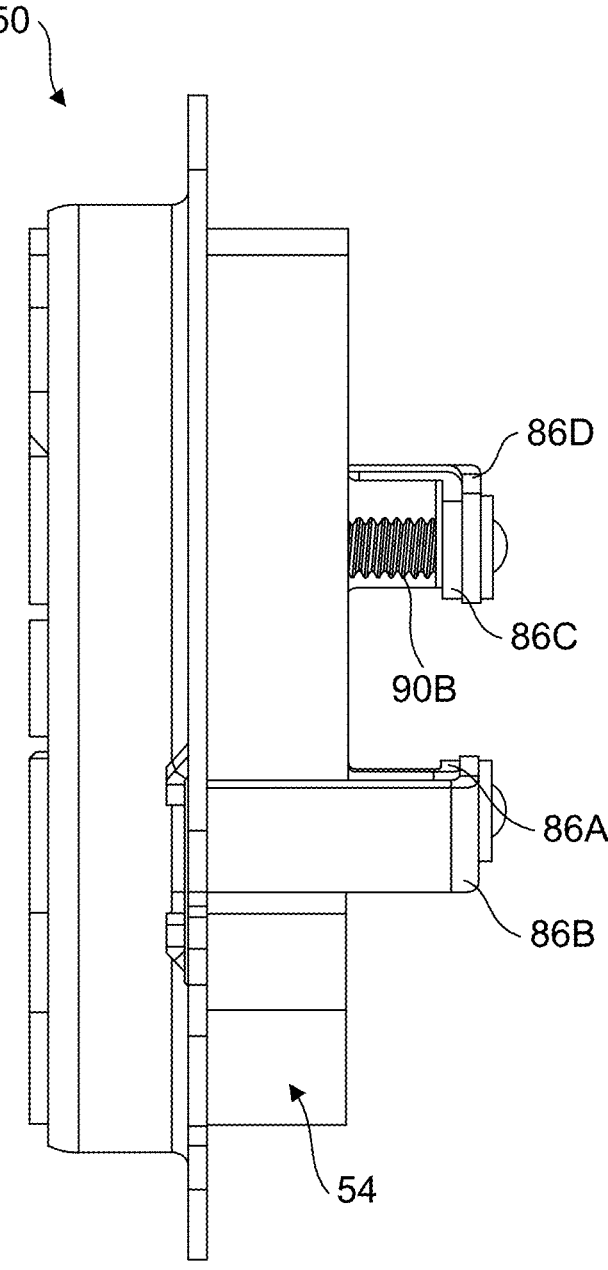
FIG. 11 is a side view of the adjustable-depth ring assembly of FIG. 9.
Figure 12:
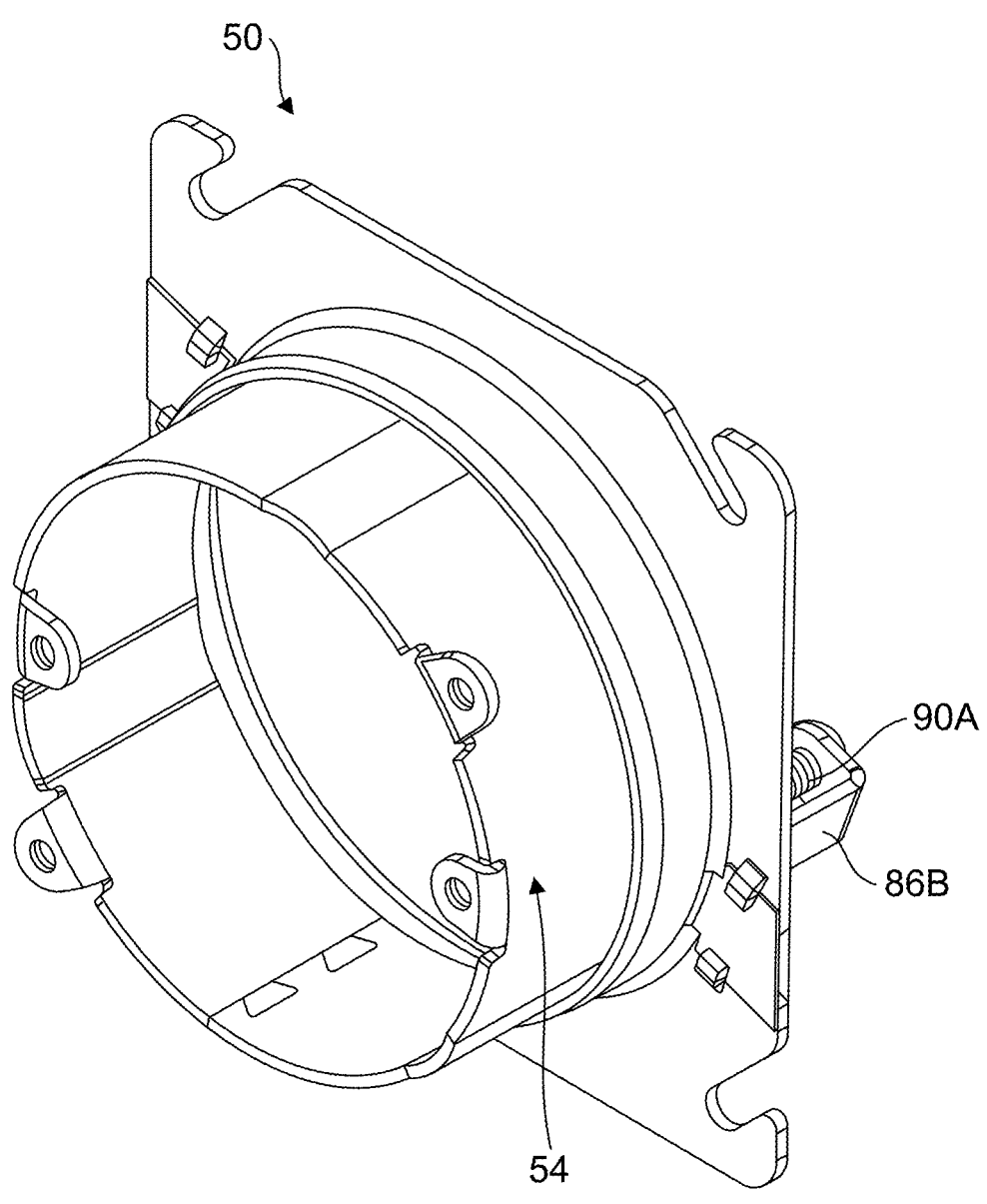
FIG. 12 is a front perspective of the adjustable-depth ring assembly of FIG. 1 with adjustment fasteners in an extended configuration.
Figure 13:
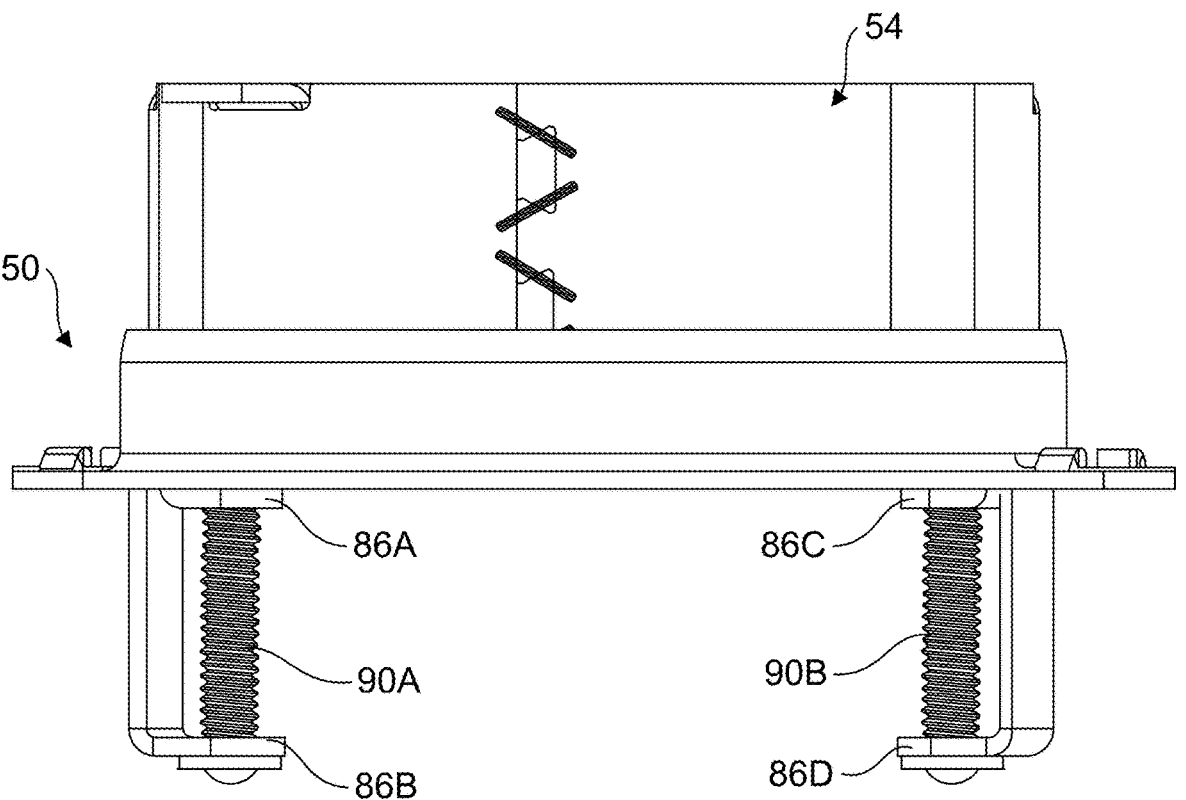
FIG. 13 is a bottom view of the adjustable-depth ring assembly of FIG. 12.
Figure 14:
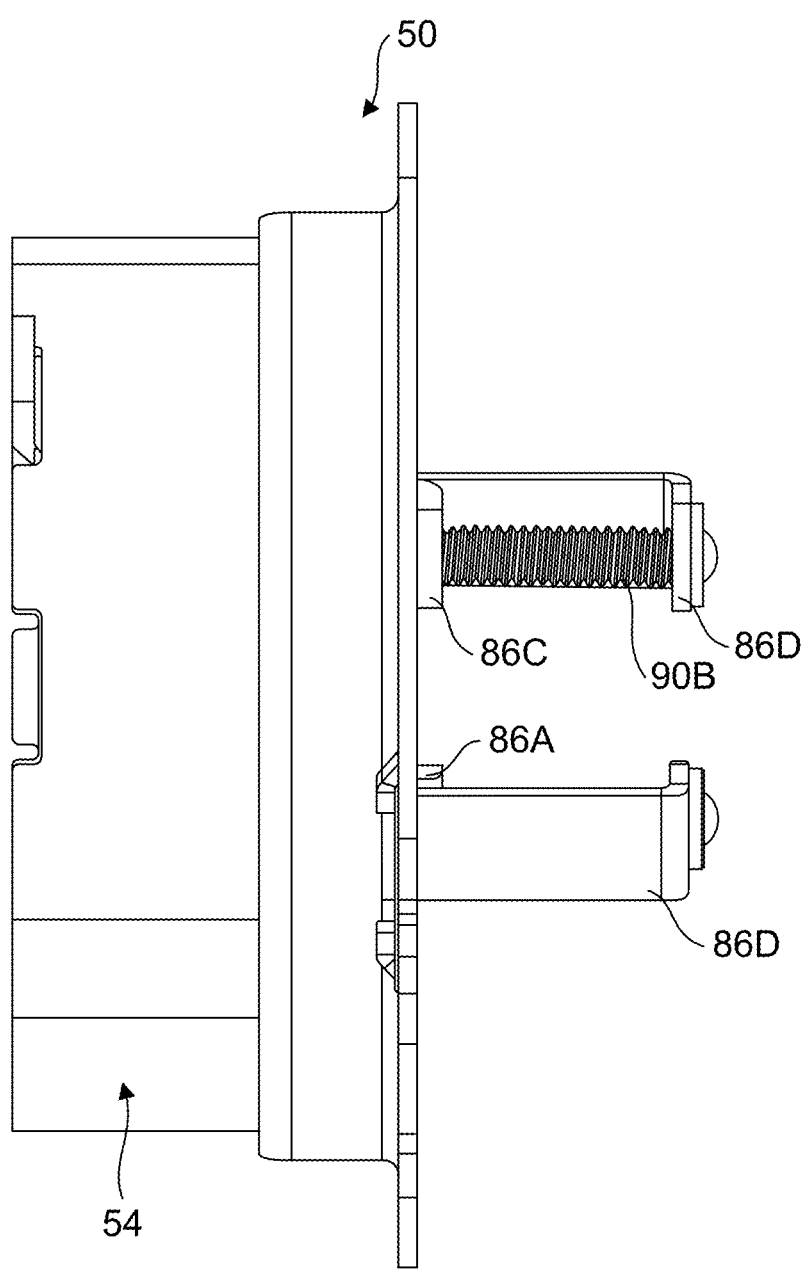
FIG. 14 is a side view of the adjustable-depth ring assembly of FIG. 12.

The extension ring 54 comprises a hollow member formed as a single unitary structure. In the illustrated embodiments, the extension ring 54 includes a strip of material bent into a shape such as a circle (e.g., the extension ring 54 FIGS. 5, 7-15) or a polygon (e.g., the extension rings 154, 254, 354, 454, 554, 654 in FIGS. 21-33) such that the extension ring is shaped and sized for a close-clearance sliding fit inside the central opening 56 of the box cover plate. The central axis CA (FIG. 2) of the extension ring 54 is generally coincident with the central axis of the box cover plate 50, and the extension ring is shaped and sized for a close-clearance sliding fit inside the central opening 56 of the box cover plate to permit forward and rearward movement of the extension ring relative to the cover plate. Referring to FIGS. 9-14, the forward movement extends the extension ring 54 to a fully extended configuration (FIGS. 12-14) while the rearward movement retracts the extension ring to a retracted configuration until the extension ring is in an installed position (FIG. 9-11). It will be understood that a plurality of positions between the fully extended configuration and the retracted configuration may be possible. As will be explained in greater detail below, the extension ring 54 can be moved relative to the cover plate 50 to achieve the desired assembly configuration for mounting the electrical device to the junction box. In the illustrated embodiment, the extension ring 54 is substantially rigid and of suitable material such as metal (e.g., galvanized steel).

Figure 5:
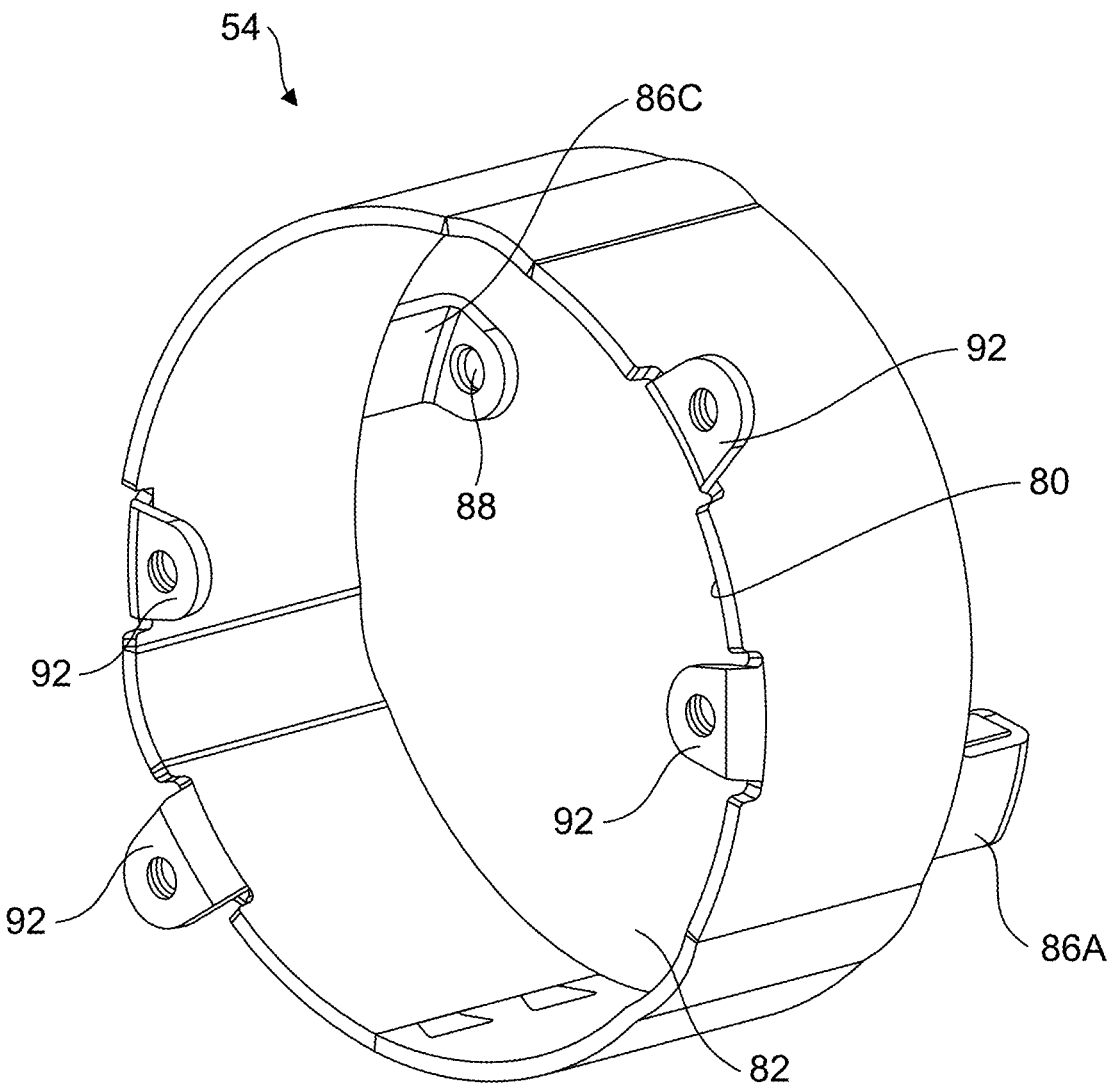
FIG. 5 is a front perspective of an extension ring of the adjustable-depth ring assembly of FIG. 1.
Figure 7:
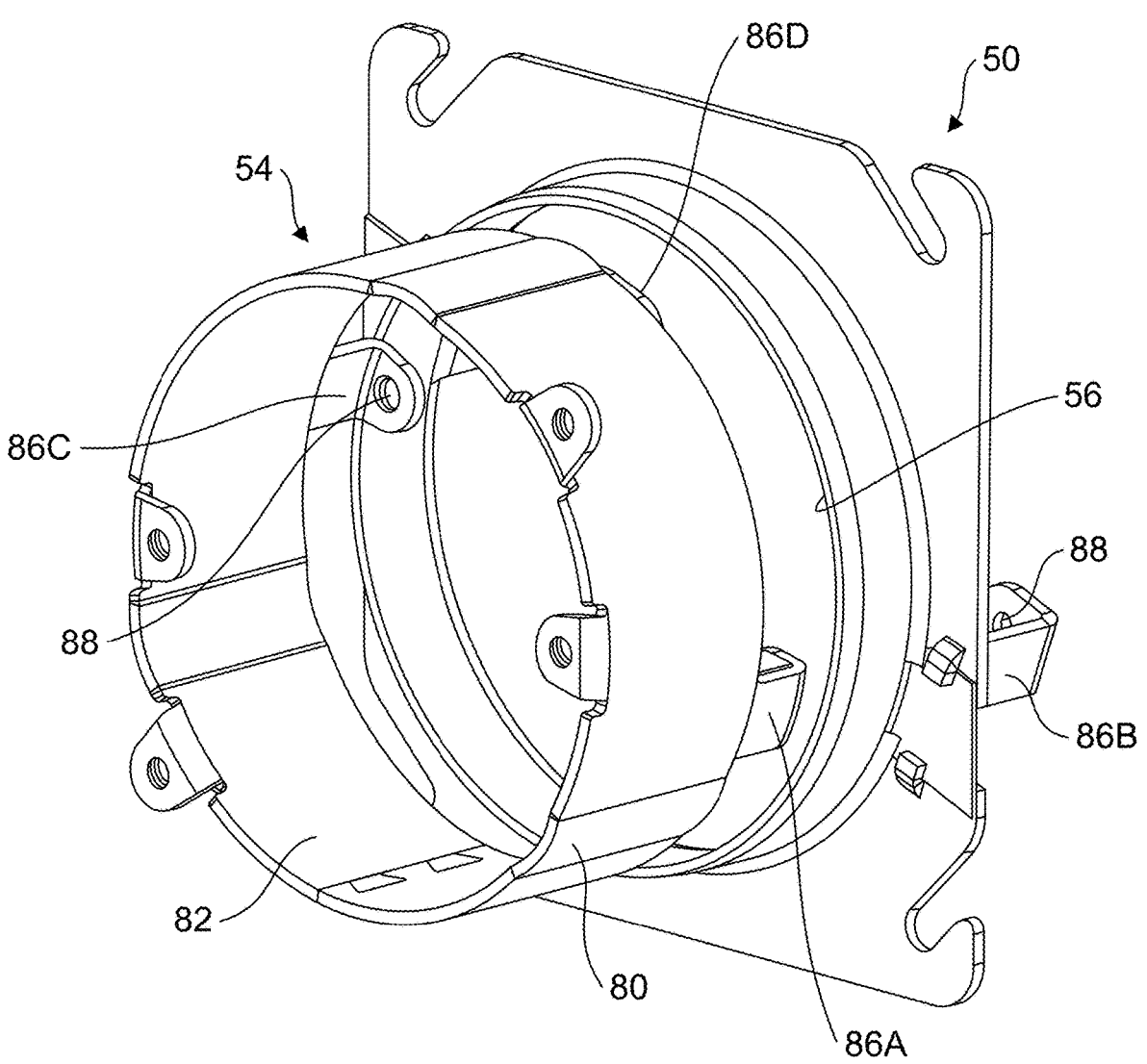
FIG. 7 is an exploded viewed of the adjustable-depth ring assembly of FIG. 1.
Figure 8:
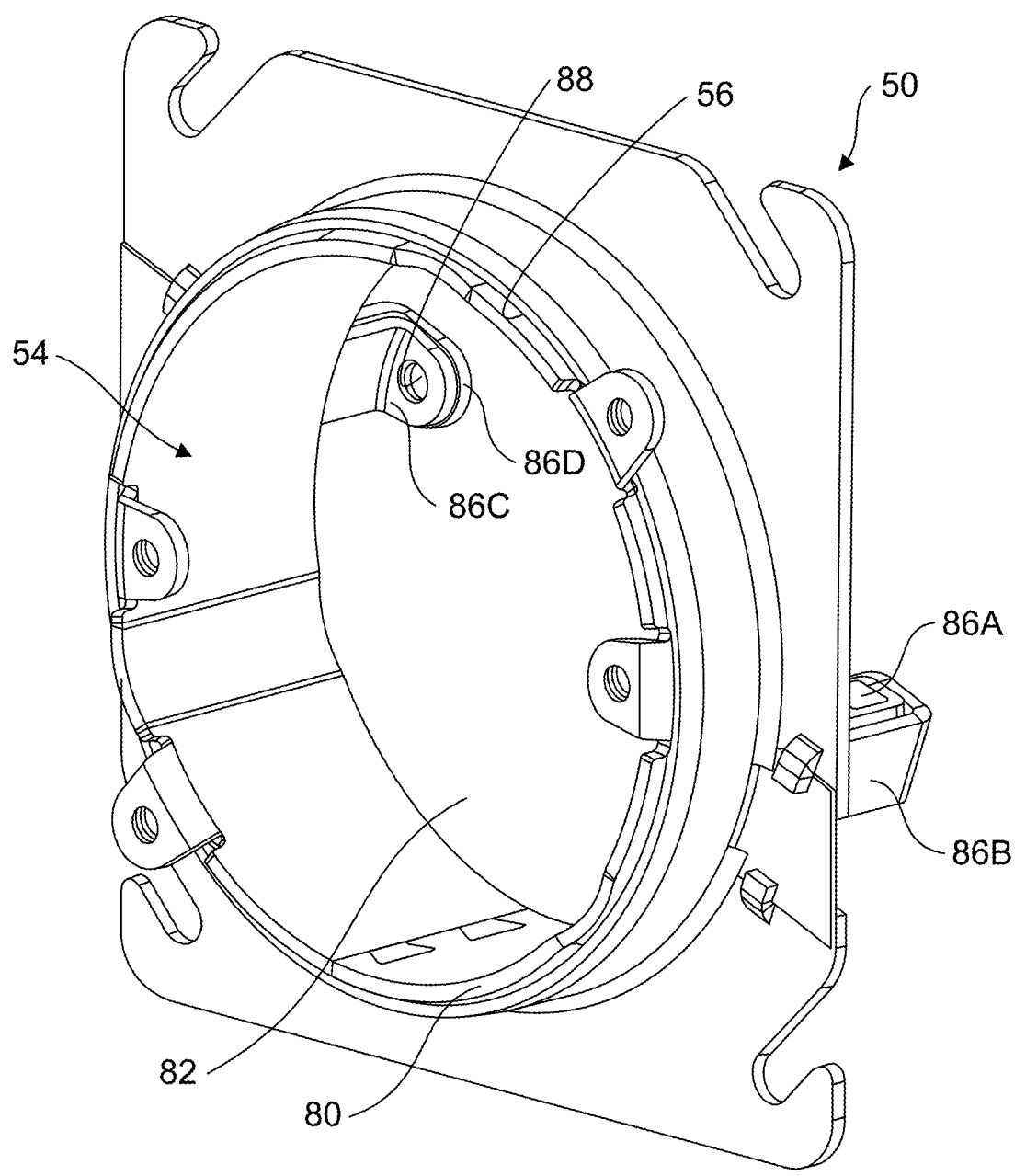
FIG. 8 is a front perspective of the adjustable-depth ring assembly of FIG. 1 shown in a retracted configuration.

Referring to FIGS. 5 and 7-8, the extension ring 54 has a side wall 80 extending rearward from the front 58 of the extension ring. The wall 80 defines a generally circular cavity 82 for receiving at least one electrical device 32 with a circular shape mounting base such as with a lighting fixture (not shown). Referring to FIGS. 21-31, the extension ring 154, 254, 354, 454, 554, 654 may include a plurality of side walls 180, 280, 380, 480, 580, 680, defining a polygonal shape such as a pentadecagon shape (FIGS. 30-31) configured to receive an electrical device with an octagonal shaped mounting base (e.g., the electrical device 632 in FIGS. 33-34) such as with a fire alarm. It will be understood in this regard that the extension ring 54 can be sized for one electrical device or multiple electrical devices (e.g., two, three, four or more) depending on the size and wiring configuration of the junction box 36. For example, referring to FIGS. 21-29, the extension ring 154, 254, 354, 454, 554 may include a plurality of side walls 180, 280, 380, 480, 580, defining an octagonal shape (FIGS. 21-24 and 26-29) or a pentagonal shape (FIG. 25), or other shapes without departing from the scope of the present disclosure. Referring to FIGS. 21-31, in embodiments having a plurality of walls 180, 280, 380, 480, 580, 680, the walls may be oriented such that the walls comprise generally planar members (FIGS. 21-22 and 25-27, and 30-31) or may include curved or bowed members (FIGS. 23-24 and 28-29).

Referring to FIGS. 5, 7-8, the extension ring 54 includes a first fastener bracket 86A and the box cover plate 50 includes a second fastener bracket 86B for securing the extension ring to the box cover plate 50. In an embodiment, the extension ring 54 includes a third fastening bracket 86C similar to the first fastening but diametrically opposing, while the box cover plate 50 includes a fourth fastening bracket 86D similar to the second fastening bracket 86B but diametrically opposing. The fastener brackets 86B, 86D of the front cover plate have a first section that extends from a bottom or interior side of the raised portion 66 of the front cover plate, and a second section that extends laterally inward from the first section towards the central axis CA (FIG. 2). The fastener brackets 86B, 86D of the front cover plate include fastener openings 88. In the illustrated embodiment, the fastener openings 88 are formed in the second section of the brackets 86B, 86D. A first section of the fastener brackets 86A, 86C of the extension ring 54 extend from a bottom or interior side of at least one side wall 80 of the extension ring, and a second section extends laterally inward form the first section towards the central axis CA (FIG. 2). The fastener brackets 86A, 86C of the extension ring 54 include fastener openings 88. In the illustrated embodiment, the fastener openings 88 are formed in the second section of the brackets 86A, 86C. The fastener openings 88 of the extension ring 54 and the box cover plate 50 align when the extension ring is slid into the inside of the central opening 56 (FIG. 8). When the extension ring 54 is in an installed position (e.g., fully retracted), the fastener brackets 86A, 86C of the extension ring rests on the fastener brackets 86B, 86D of the box cover plate 50. However, the distance between the fastener brackets may vary without departing from the present disclosure.

Referring to FIGS. 9-14, an adjustment fastener 90A adjustably fastens through a first fastener bracket 86A of the extension ring 54 to the second fastening bracket 86B to adjust an extension dimension of the extension ring. Further, an adjustment fastener 90B adjustably fastens through the third fastener bracket 86C of the extension ring 54 to the fourth fastening bracket 86D of the box cover plate 50 to adjust an extension dimension of the extension ring. Actuation of the adjustment fasteners 90A, 90B adjusts a position of the extension ring 54 relative to the plate cover by moving the first and third fastener brackets towards and away from the second and fourth fastener bracket. Thus, the position of the extension ring 54 may be adjusted between the installed/retracted position and the fully extended position by actuating the adjustment fasteners 90A, 90B. In the illustrated embodiment, there are two adjustment fasteners 90A, 90B corresponding to the two pairs of fastening brackets 86A, 86B and 86C, 86D. However, the number of fastener brackets 86 and adjustment fasteners 90 may vary without departing from the present disclosure.

Referring to FIGS. 5 and 9-10, tabs 92 extend laterally from the front or outer edge of the side wall 80 of the extension ring 54. Each tab 92 includes a bent portion extending directly from the front 58 of the ring 54 and a planar portion extending from the bent portion. In the illustrated embodiment, the plant portion extends generally orthogonally to the side wall 80. Referring to FIG. 10, an outer surface of the planar portion of each tab 92 is generally flush with the front 58 of the extension ring 54. Alternatively, an inner surface of the planar portion of each tab 92 may be generally flush with the front 58 of the extension ring such that the outer surface of the planar portion of each tab 92 may be offset from the front 58 of the extension ring 54. The number of tabs in each embodiment may vary without departing from the scope of the disclosure.

Embodiment One of the Extension Ring Tabs

Figure 15:
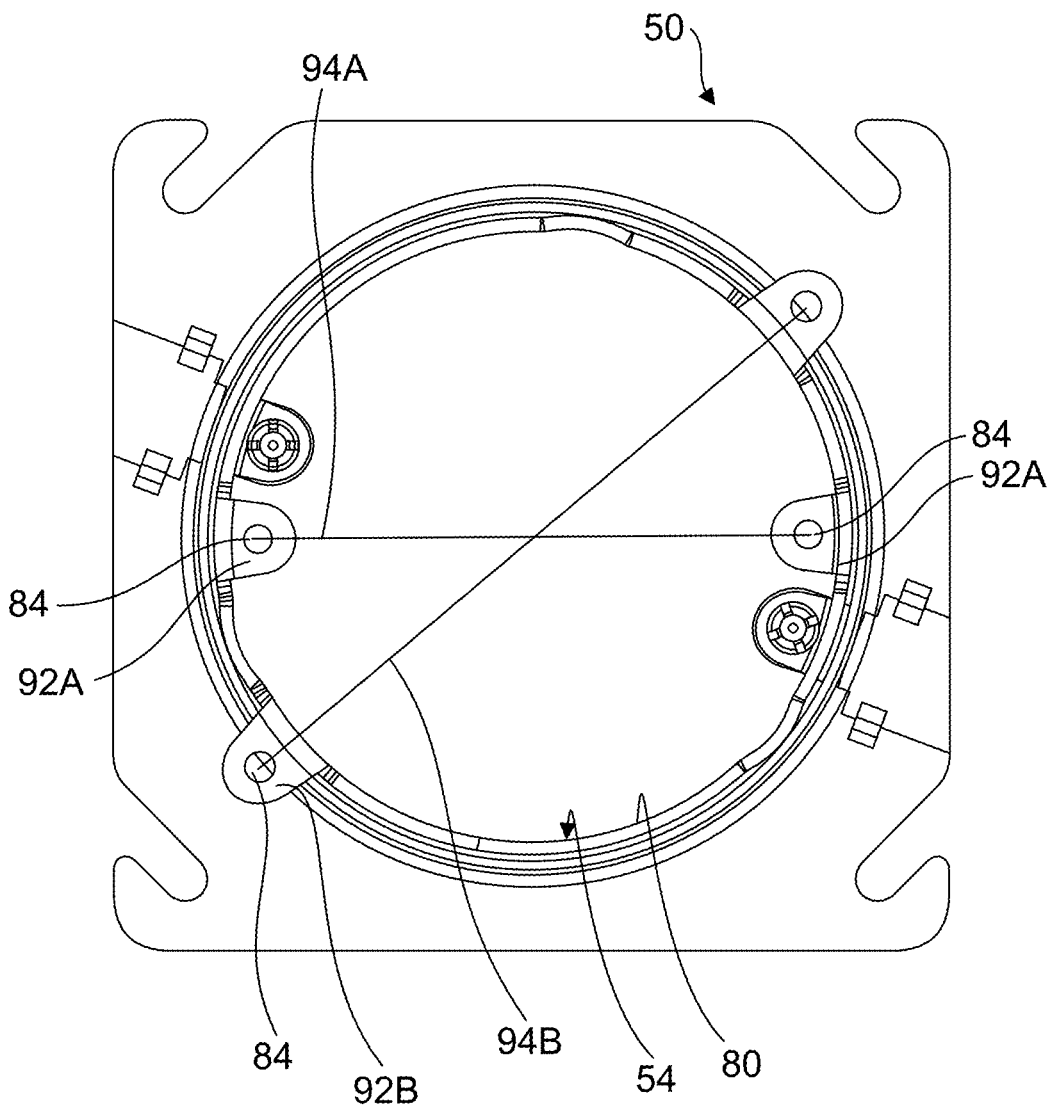
FIG. 15 is a front view of the adjustable-depth ring assembly of FIG. 9.
Figure 16:
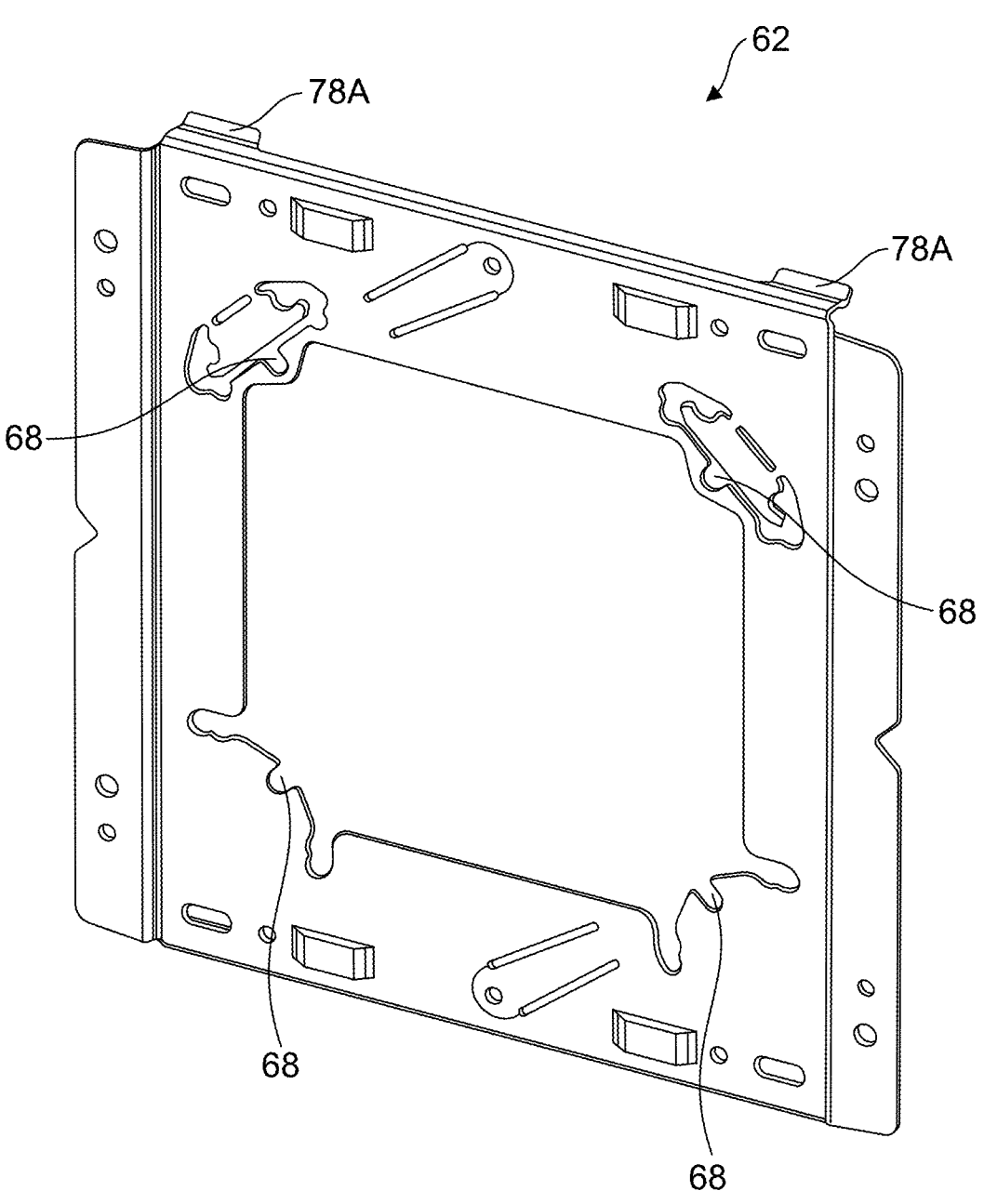
FIG. 16 is a front perspective view of a mounting bracket of the adjustable-depth ring assembly of FIG. 1.
Figure 17:
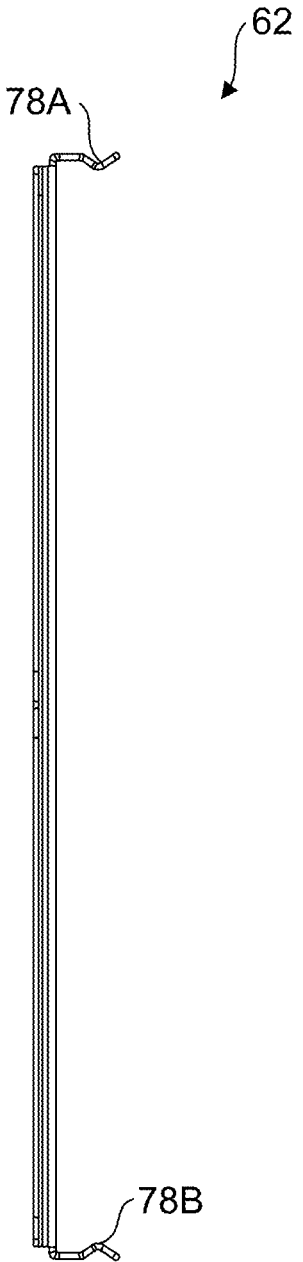
FIG. 17 is a side view of the mounting bracket of FIG. 16.

Referring to FIGS. 9 and 15, there are four tabs 92 circumferentially spaced around the side wall 80. The tabs

92 may be distinguished as a first pair of tabs 92A and as a second pair of tabs 92B with each including at least one fastener opening 84. The fastener openings 84 of the first pair of tabs 92A are diametrically opposing and are separated by a line segment 94A (FIG. 15). The fastener openings 84 of the second pair of tabs 94B are diametrically opposing and are separated by a line segment 94B (FIG. 15). The line segments 924, 94B indicate the distance between diametrically opposing fastener openings 84 in the first and second pair of tabs 92A, 92B. The line segment 94B of the second pair of tabs 92B is greater than the line segment 94A of the first pair of tabs 92A. Thus, the fastener openings 84 on the second pair of tabs 92B are spaced further apart than the fastener openings 84 in the first pair of tabs 92A. In one embodiment, the line segment 94A for the first pair of tabs 92A is about 2.69 inches, and the line segment 94B between the second pair of tabs 92B is about 3.5 inches. The line segment 94B of the second pair of tabs 92B is greater than the line segment 94A of the first pair of tabs 92A because the second pair of tabs extend laterally away from the center axis CA (FIG. 2) while the first pair of tabs laterally extend towards the center axis. The line segments 94A, 94B may also intersect at a center of the extension ring 54 such that an intersection point of the line segments occurs along the central axis CA. Referring to this embodiment, the tabs 92A, 92B alternate between laterally outward extending away from the central axis CA and laterally inward extending towards the central axis. In one embodiment, one of the laterally outward extending tab 92B is angularly spaced from one of said plurality of tabs 92A extending laterally inward from the extension ring by an angle less than 90 degrees.

Embodiment Two of the Extension Ring Tabs

Figure 22:
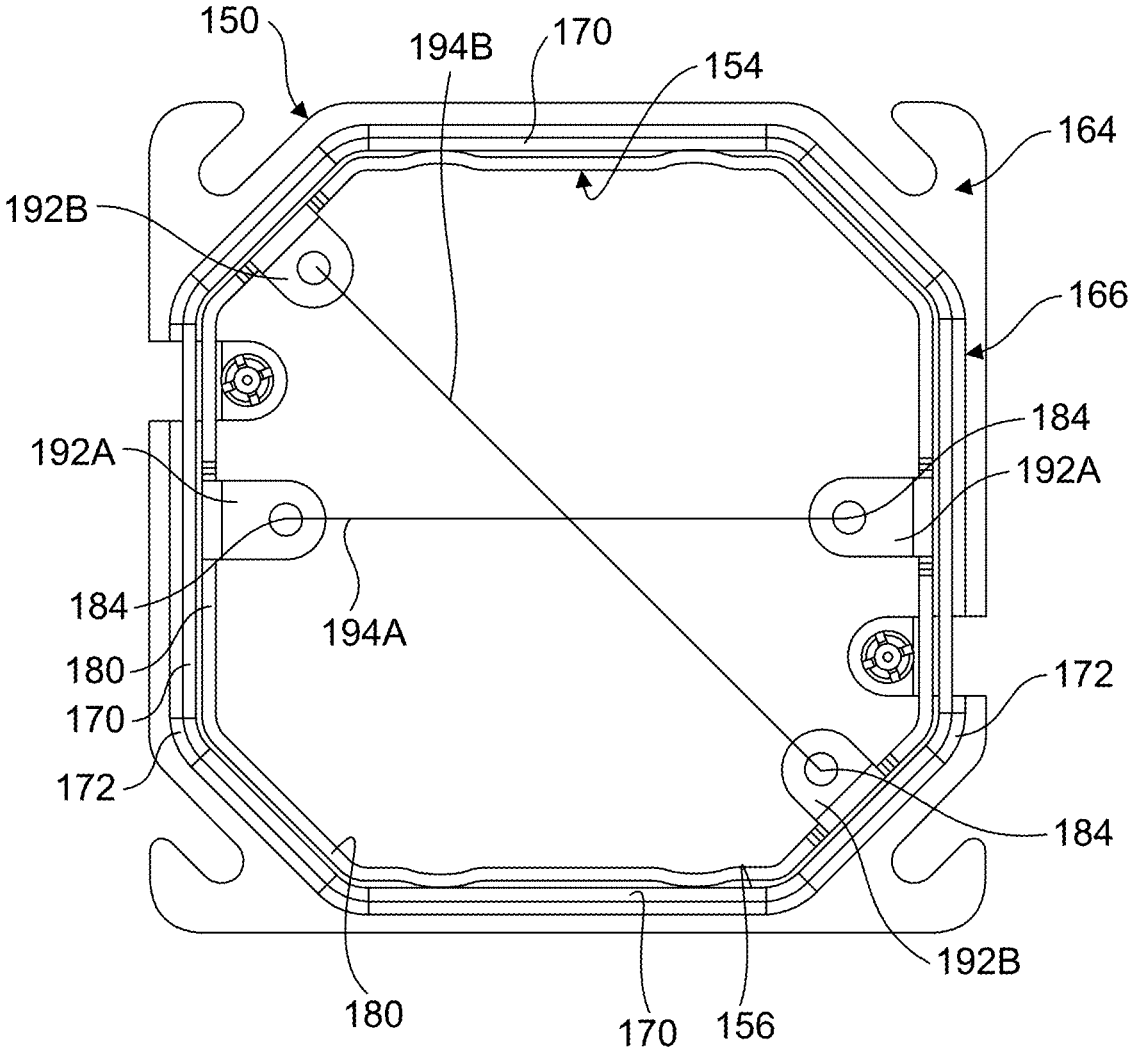
FIG. 22 is a front view of the adjustable-depth ring assembly of FIG. 21.
Figure 23:
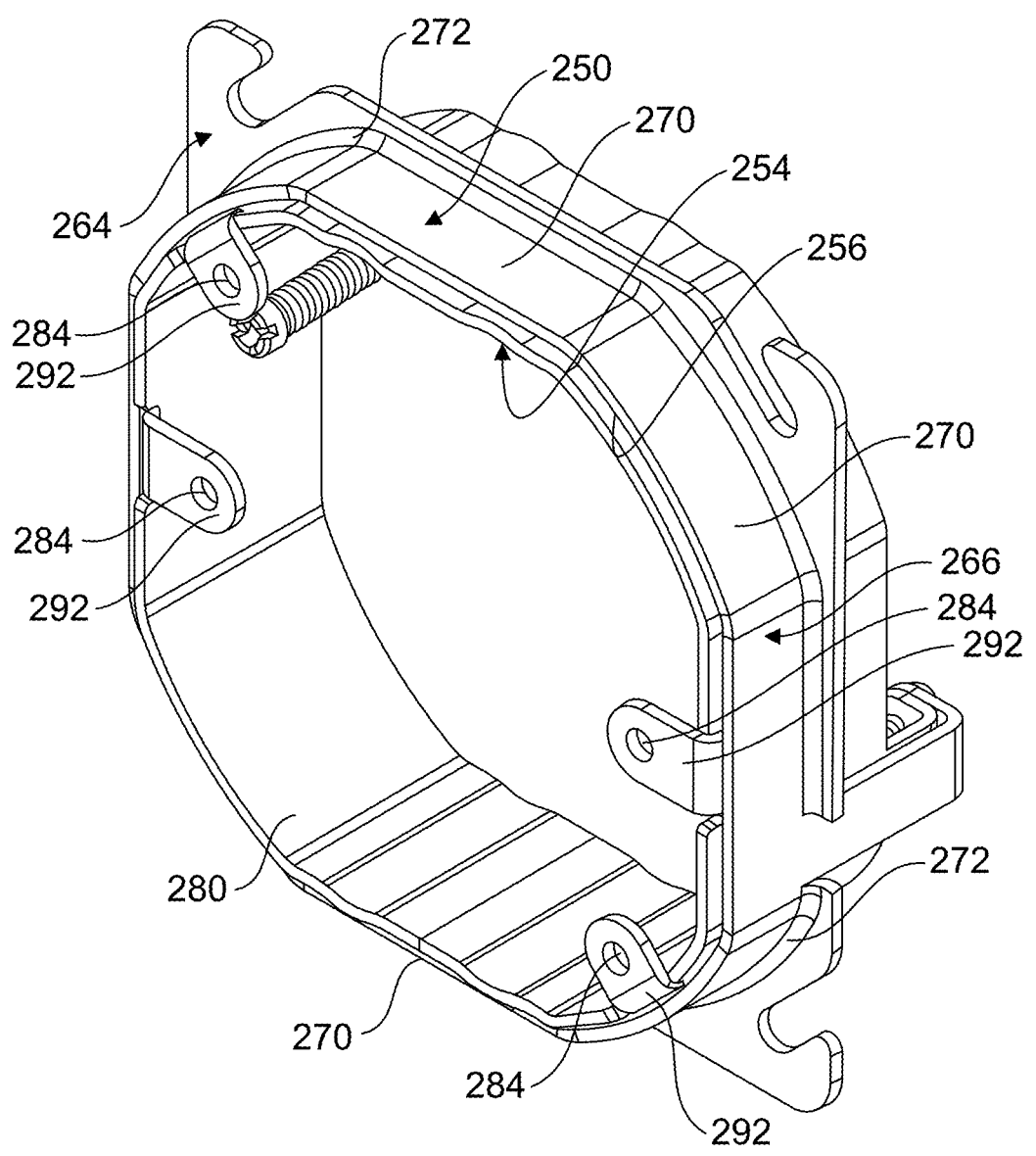
FIG. 23 is a front perspective view of an another embodiment of an adjustable-depth ring assembly.
Figure 24:
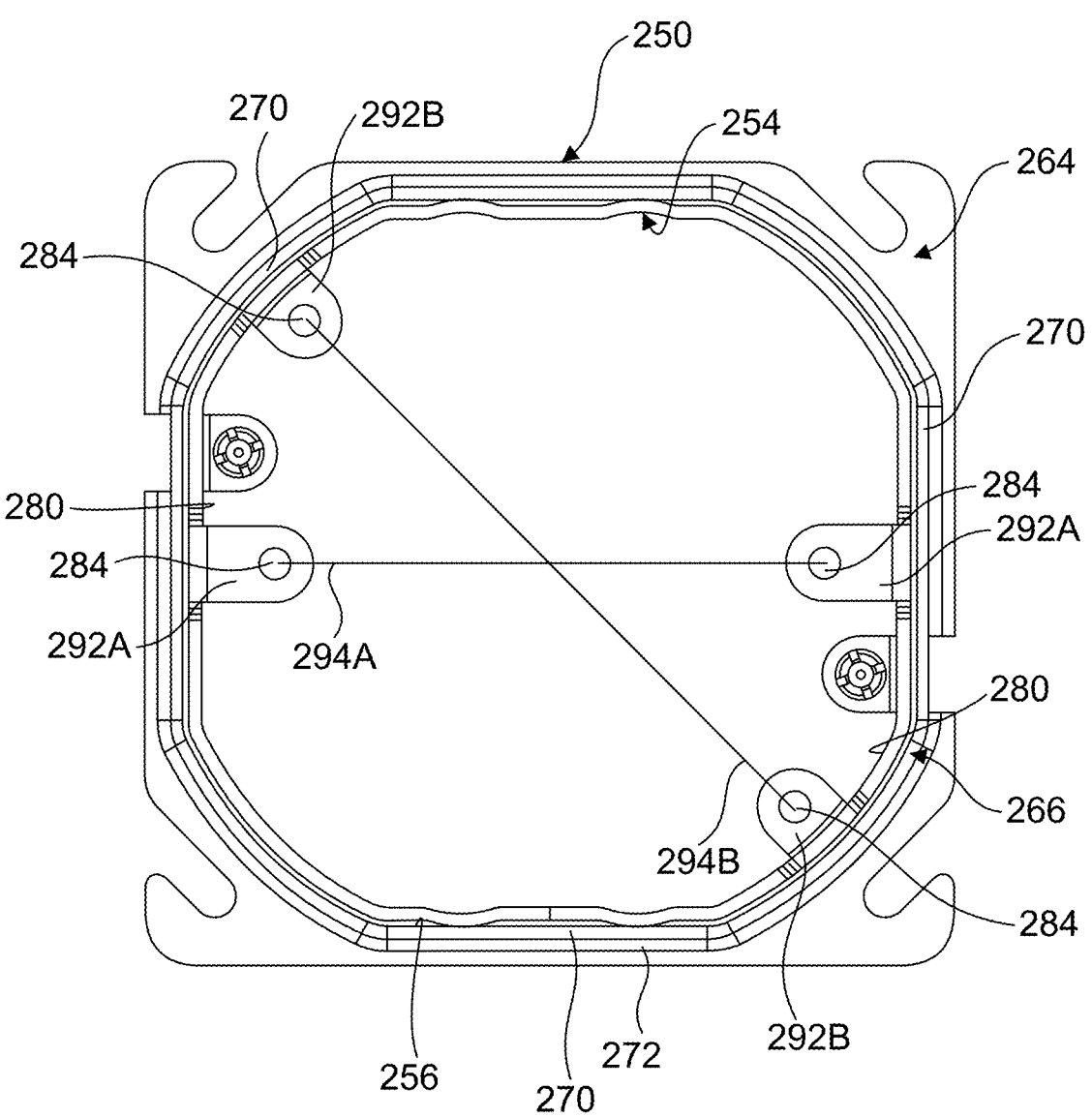
FIG. 24 is a front view of the adjustable-depth ring assembly of FIG. 23.
Figure 25:
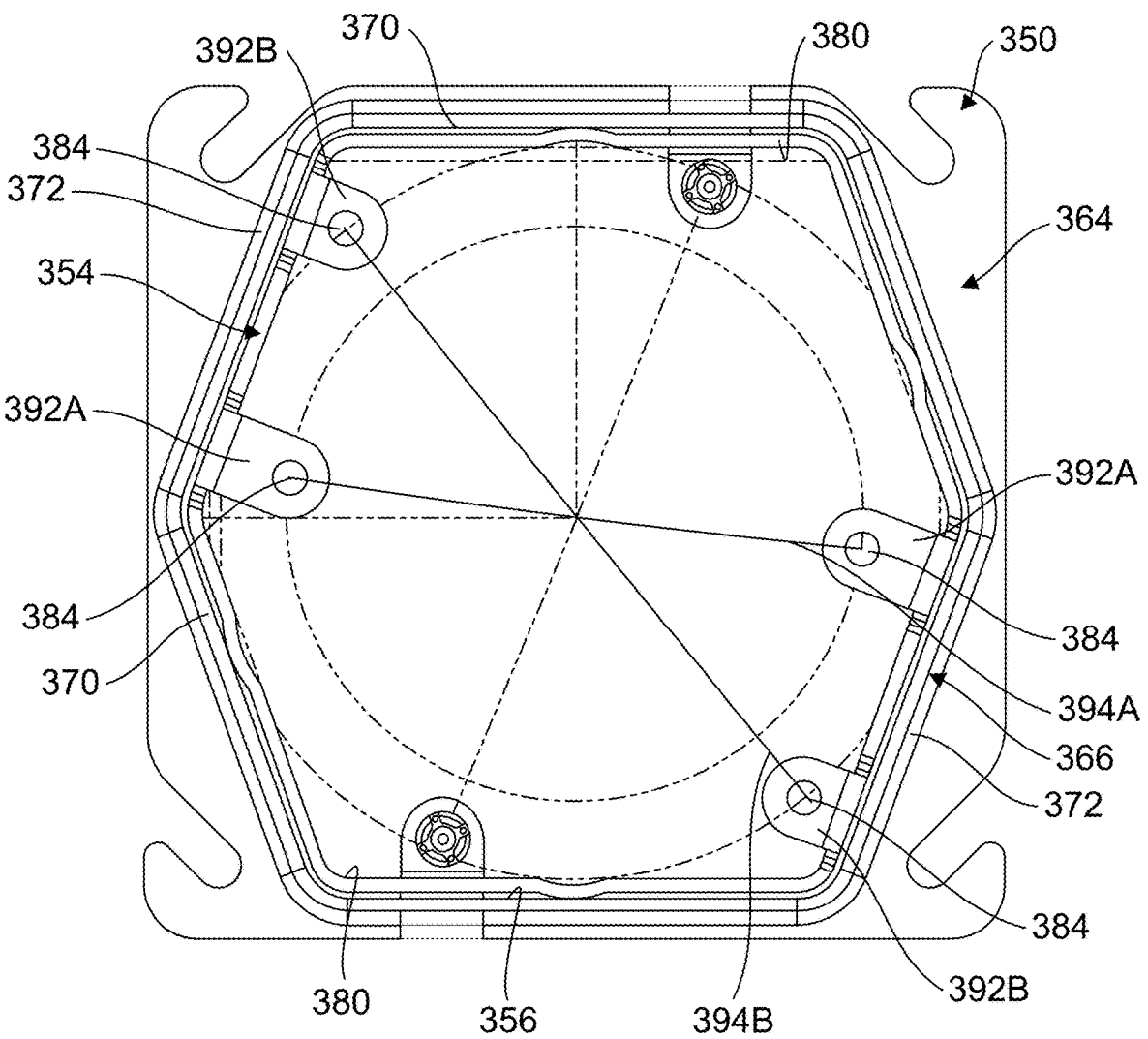
FIG. 25 is a front perspective view of another embodiment of an adjustable-depth ring assembly.
Figure 26:
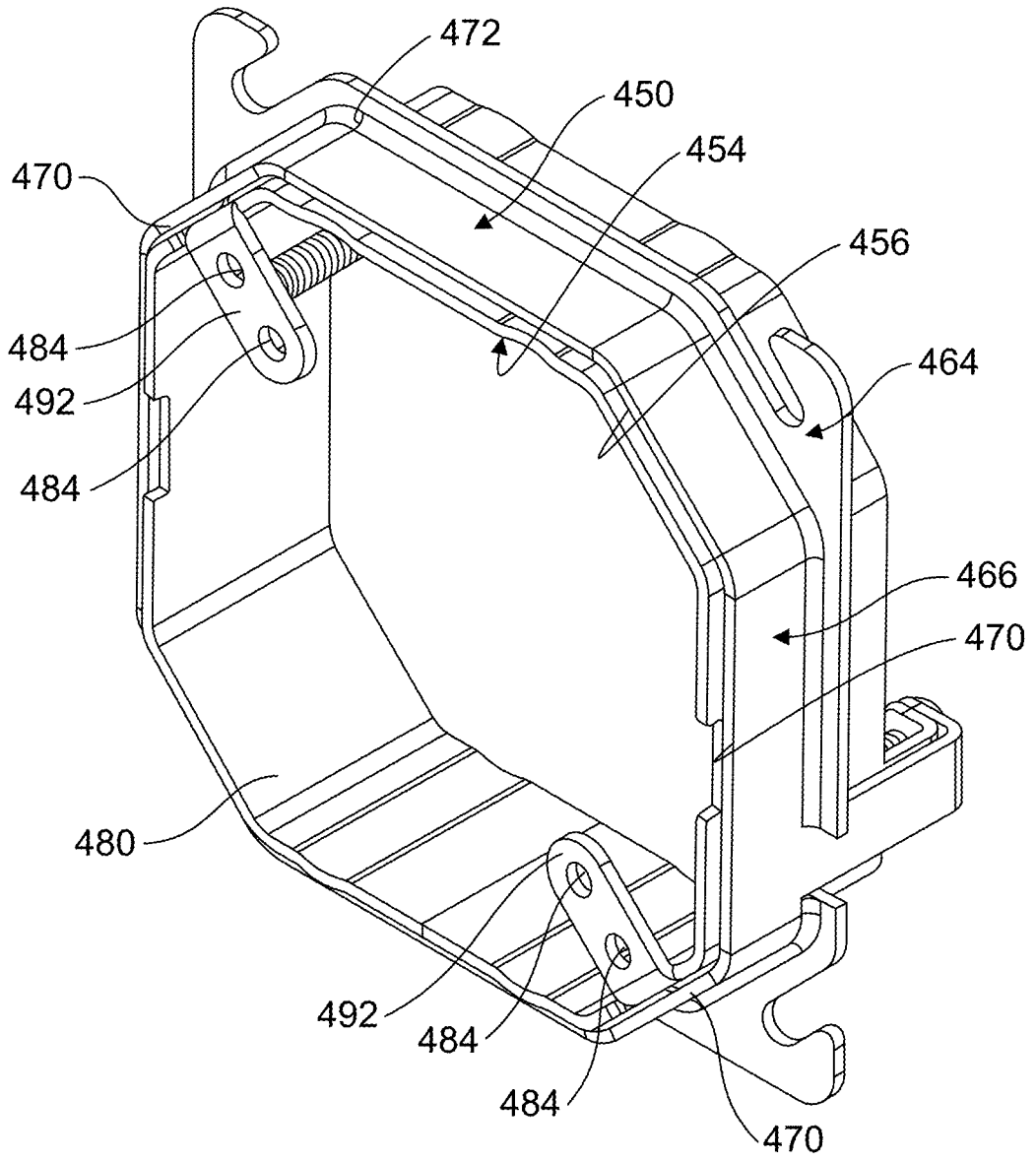
FIG. 26 is a front perspective view of another embodiment of an adjustable-depth ring assembly.

Referring to FIGS. 21-25, an alternate tab arrangement is shown. In this embodiment, there are four tabs spaced along the side walls 180, 280, 380 of the extension ring 154, 254, 354. Referring to FIGS. 22, 24, and 25, the tabs (e.g., tabs 192 of FIG. 21 and tabs 292 of FIG. 23) may be distinguished as a first pair of tabs 192A, 292A, 392A and as a second pair of tabs 192B, 292B, 392B with each including at least one fastener opening 184, 284, 384. The fastener openings 184, 284, 384 of the first pair of tabs 192A, 292A, 392A are diametrically opposing and are separated by a line segment 194A, 294A, 394A. The fastener openings 184, 284, 384 of the second pair of tabs 192B, 292B, 392B are diametrically opposing and are separated by a line segment 194B, 294B, 394B. The line segments 194A, 294A, 394A, 194B, 294B, 394B indicate the distance between diametrically opposing fastener openings 184, 284, 384 in the first and second pair of tabs 192, 292, 392. The line segments 194A, 294A, 394A, 194B, 294B, 394B may intersect at a center of the extension ring 154, 254, 354 such that an intersection point of the line segments occurs along the central axis. The line segment 194B, 294B, 394B of the second pair of tabs 192B, 292B, 392B is greater than the line segment 194A, 294A, 394A of the first pair of tabs 192A, 292A, 392A. In an embodiment, the line segment first pair of tabs 192A, 292A, 392A is about 2.69 inches and the line segment between the second pair of tabs 192B, 292B, 392B is about 3.5 inches. In this embodiment, the line segment 194B, 294B, 394B of the second pair of tabs 192B, 292B, 392B is greater than the line segment 194A, 294A, 394A of the first pair of tabs 192A, 292A, 392A because the planar portion of the second pair of tabs extends further towards the center axis CA (FIG. 2) than the planar portion of the first pair of tabs. Alternatively, the planar portion of the tabs 192, 292, 392 may all extend at a same length towards the center, but the first pair of tabs 192A, 292A, 392A may have their fastener openings 184, 284, 384 more proximal towards the center axis than the second pair of tabs 192B, 292B, 392B.

Embodiment Three of the Extension Ring Tabs

Figure 27:
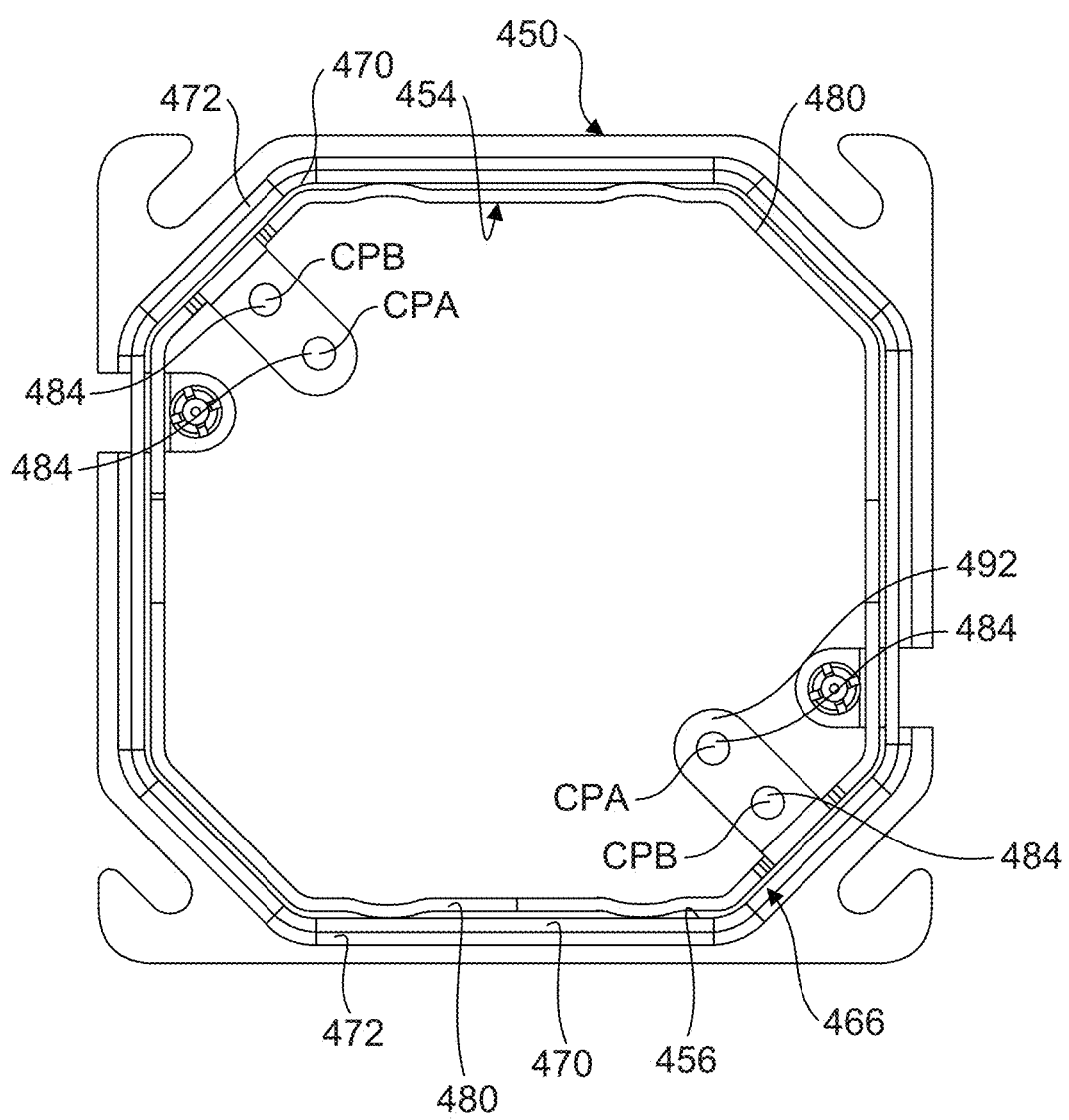
FIG. 27 is a front view of the adjustable-depth ring assembly of FIG. 26.
Figure 28:
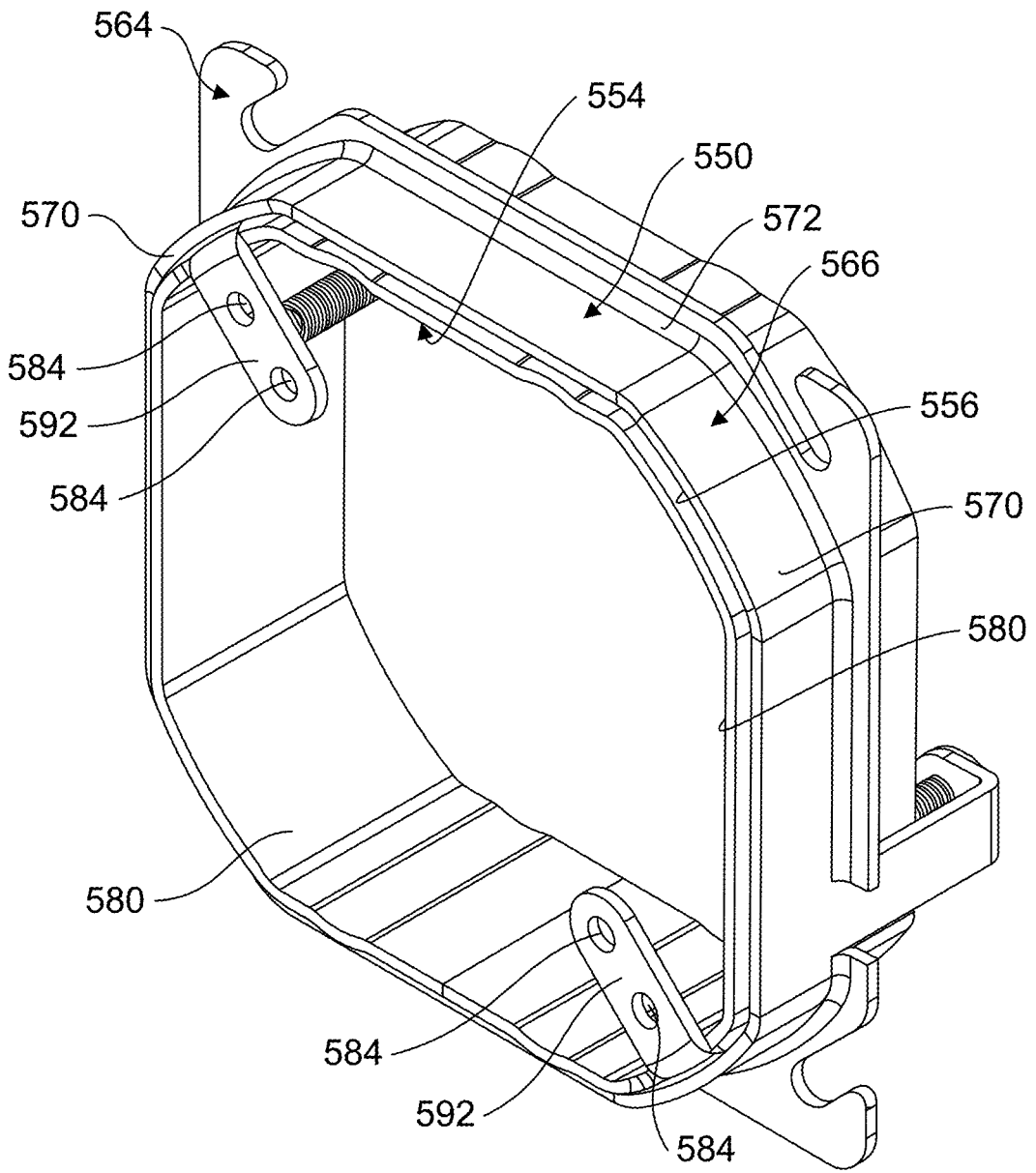
FIG. 28 is a front perspective view of another embodiment of an adjustable-depth ring assembly.
Figure 29:
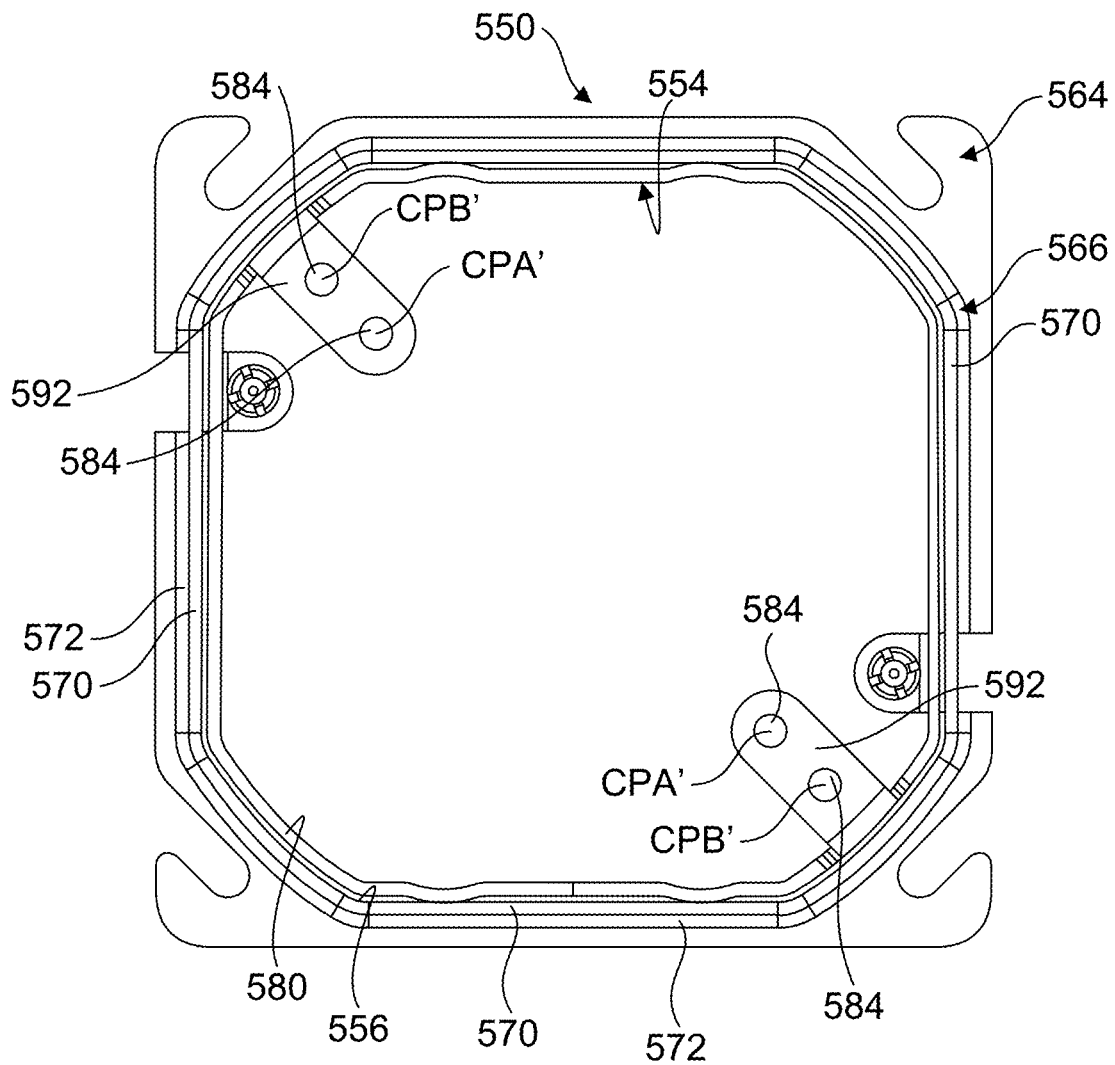
FIG. 29 is a front view of the adjustable-depth ring assembly of FIG. 28.
Figure 30:
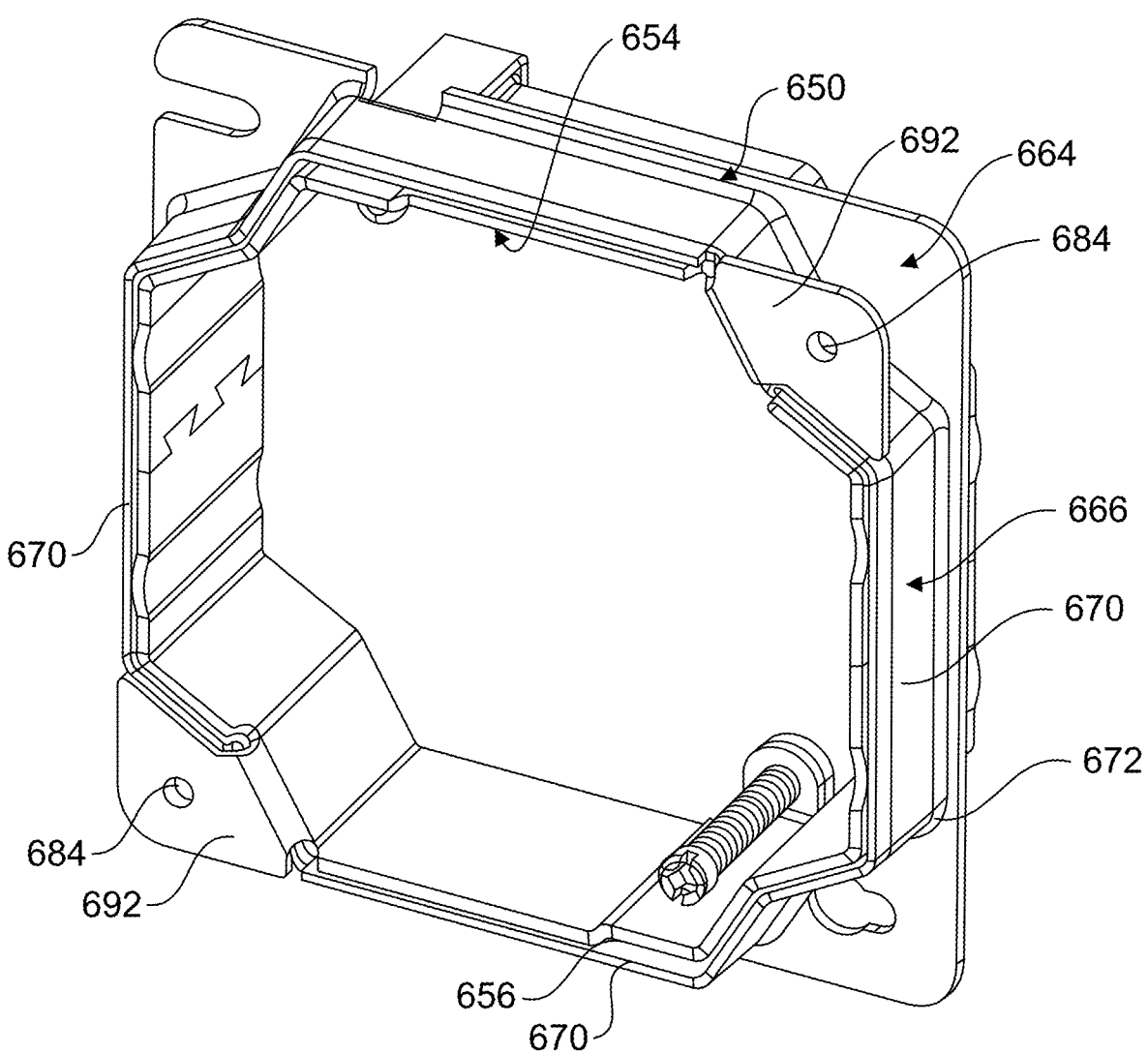
FIG. 30 is a front perspective view of another embodiment of an adjustable-depth ring assembly in a retracted configuration.
Figure 31:
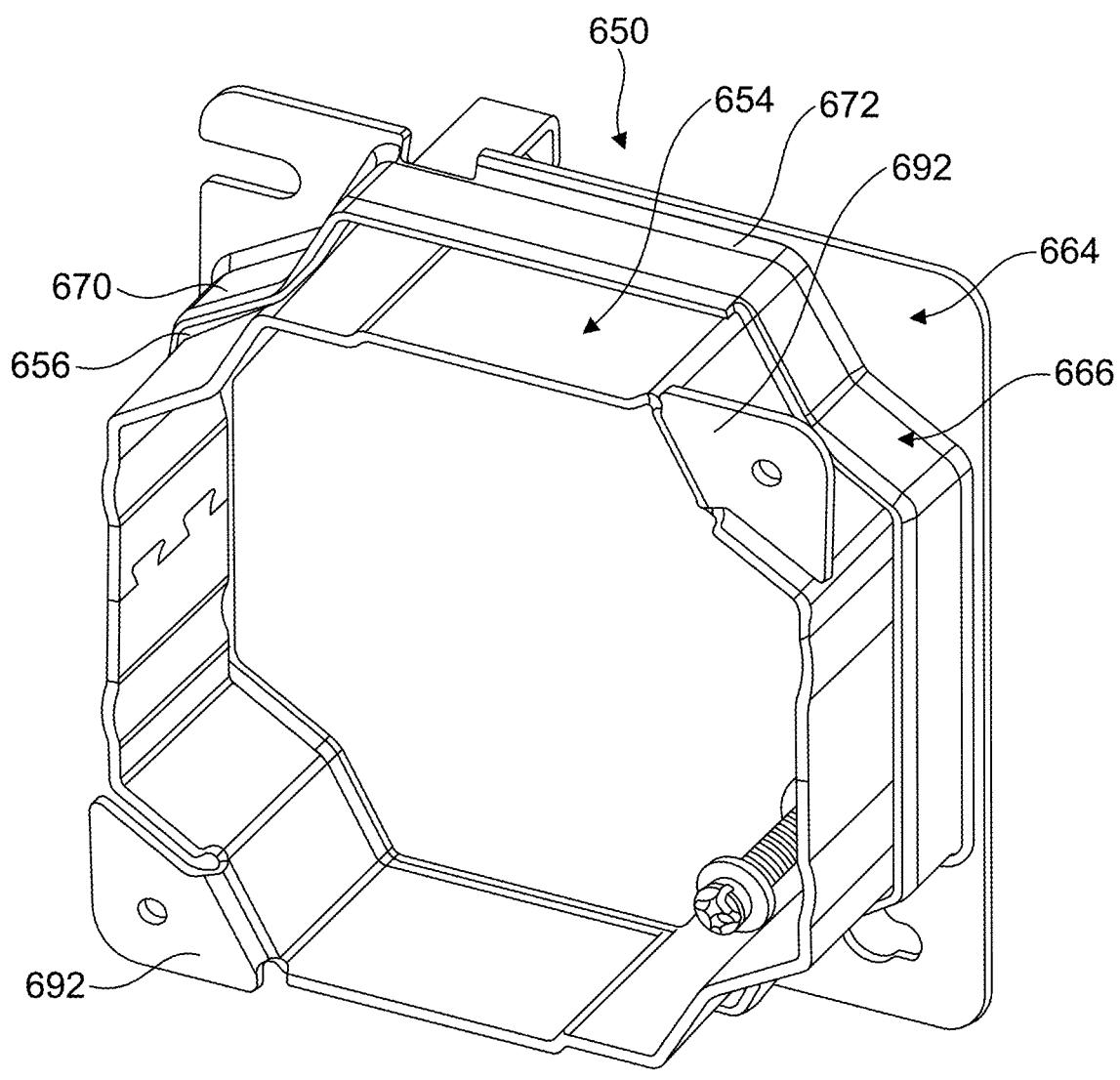
FIG. 31 is a front perspective of the adjustable-depth ring assembly of FIG. 30 in an extended configuration.

Referring to FIGS. 26-29, an alternate tab arrangement is shown. In this embodiment there are two tabs 492, 592 spaced along the side walls 480, 580 each tab defining a plurality of fastener openings 484, 584. The fastening opening 484, 584 on one of the tabs 492, 592 is diametrically opposing at least one fastener opening on the other tab. Two diametrically opposed fastener openings 484, 584 form a pair of fastener openings separated by a line segment between center points of the fastener openings 484, 584. The fastener openings 484, 584 of the tabs 492, 592 can be described as proximal fastener openings and distal fastener openings with the proximal and distal fastener openings laterally spaced along the planar portion of each tab. Distal and proximal are used to describe comparable distances from the central axis CA (FIG. 2) such that the distal fastener openings are further from the central axis than the proximal fastener openings. Therefore, the fastener openings 484, 584 on the tabs 492, 592 are diametrically opposing and spaced apart such that the distal fastener openings on the tabs are separated by the line segment from center point CPB, CPB' to center point CPB, CPB' of the distal fastener openings and greater than the line segment from center point CPA, CPA' to center point CPA, CPA' of the proximal fastener openings (FIGS. 27 and 29). In this embodiment, the line segments are coincident with each other therefore the line segments "intersect" or are disposed over each other at the central axis CA.

Embodiment Four of the Extension Ring Tabs

Referring to FIGS. 30-31, 32A-32C, and 33, an alternate tab arrangement is shown. In this embodiment, of the extension ring 654 includes two tabs 692 with each including at least one fastener opening 684. The tabs 692 laterally extend away from the central axis CA (FIG. 33) such that the fastener openings are outside of the central opening 656 of the box cover plate 650. The fastener openings 684 are diametrically opposing fastener at a distance of a line segment that crosses through the central axis.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions products without departing from the scope of the invention, it is intended that all matter contained in the above description and shown in the accompanying drawings shall be interpreted as illustrative and not in a limiting sense.

What is claimed is:

1. An adjustable-depth ring assembly for connection to an electrical box that is accessible through a structure opening in a structure disposed forward of the electrical box, the assembly comprising:

a cover plate configured for attachment to the electrical box, the cover plate including a planar rigid plate and a raised portion projecting laterally from the rigid plate and defining an opening;

an extension ring sized for reception in the opening of the cover plate to couple the extension ring to the cover plate, said extension ring defining a cavity, the extension ring being movable relative to the cover plate along an axis extending in front-to-back direction such that an axial distance between a front of the extension ring and the cover plate can be adjusted to accommodate structures of different thicknesses;

a first pair of tabs extending laterally from the extension ring, each tab of the first pair of tabs defining an opening for mounting an electrical device to the extension ring, wherein a line segment connects centers of the openings of the first pair of tabs; and a second pair of tabs extending laterally from the extension ring, each tab of the second pair of tabs defining an opening for mounting an electrical device to the extension ring, wherein a line segment connects centers of the openings of the second pair of tabs, the line segments connecting the centers of the openings in each pair of tabs intersecting at a center of the ring.

2. The adjustable-depth ring assembly of claim 1, wherein the first pair of tabs extend laterally inward from the extension ring, and the second pair of tabs extend laterally outward from the extension ring.

3. The adjustable-depth ring assembly of claim 2, wherein the plurality of tabs extending laterally outward and inward from the extension ring alternate between outwardly and inwardly extending tabs.

4. The adjustable-depth ring assembly of claim 1, wherein the tabs include a bent portion extending directly from the extension ring and a planar portion extending from the bent portion, the planar portion being generally bell shaped.

5. The adjustable-depth ring assembly of claim 1, wherein the tabs include a bent portion extending directly from the extension ring and a planar portion extending from the bent portion, the planar portion being generally polygonal shaped.

6. The adjustable-depth ring assembly of claim 1, wherein the extension ring has a front face generally round in shape.

7. The adjustable-depth ring assembly of claim 6, wherein the tabs are radially spaced apart and extend from the front face of the extension ring.

8. The adjustable-depth ring assembly of claim 2, wherein one of said plurality of tabs extending laterally outward from the extension ring is angularly spaced from one of said plurality of tabs extending laterally inward from the extension ring by an angle less than 90 degrees.

9. The adjustable-depth ring assembly of claim 2, wherein the plurality of tabs extending laterally outward from the extension ring comprise a pair of diametrically opposed tabs.

10. The adjustable-depth ring assembly of claim 9, wherein a distance between the openings in the diametrically opposed tabs is about 3.5 inches.

11. The adjustable-depth ring assembly of claim 1, wherein the first and second pair of tabs extend laterally inward from the extension ring.

12. The adjustable-depth ring assembly of claim 1, wherein the cover plate includes a first fastener bracket extending from the raised portion, wherein the extension ring includes a second fastener bracket extending therefrom, and wherein the adjustable-depth ring assembly further includes an adjustment fastener configured to adjustably fasten through the first fastener bracket to the second fastening bracket to adjust an extension dimension of the extension ring.

13. The adjustable-depth ring assembly of claim 12, wherein actuation of the adjustment fastener adjusts a position of the extension ring relative to the plate cover by moving the first fastener bracket towards and away from the second fastener bracket.

14. The adjustable-depth ring assembly of claim 1, wherein the raised portion and the extension ring are configured to receive and secure an octagonal base mount in the opening and the cavity.

15. The adjustable-depth ring assembly of claim 1, wherein a center-to-center distance between the openings in the tabs in the second pair of tabs is greater than a center-to-center distance between the openings in the tabs in the first pair of tabs.

16. The adjustable-depth ring assembly of claim 1, wherein the line segment between the openings of the second pair of tabs is greater than the line segment between the openings of the first pair of tabs.

17. An adjustable-depth ring assembly for connection to an electrical box that is accessible through a structure opening in a structure disposed forward of the electrical box, the assembly comprising:

a cover plate configured for attachment to the electrical box, the cover plate including a planar rigid plate and a raised portion projecting laterally from the rigid plate and defining an opening;

an extension ring sized for reception in the opening of the cover plate to couple the extension ring to the cover plate, said extension ring defining a cavity, the extension ring being movable relative to the cover plate along an axis extending in front-to-back direction such that an axial distance between a front of the extension ring and the cover plate can be adjusted to accommodate wall members of different thicknesses;

a pair of tabs extending laterally outward from the extension ring, each tab of the pair of tabs defining an opening for mounting an electrical device to the extension ring, wherein a line segment connecting centers of the openings of the pair of tabs intersects a center of the extension ring.

18. An adjustable-depth ring assembly for connection to an electrical box that is accessible through a structure opening in a structure disposed forward of the electrical box, the assembly comprising:

a cover plate configured for attachment to the electrical box, the cover plate including a planar rigid plate and a raised portion projecting laterally from the rigid plate and defining an opening;

an extension ring sized for reception in the opening of the cover plate to couple the extension ring to the cover plate, said extension ring defining a cavity, the extension ring being movable relative to the cover plate along an axis extending in front-to-back direction such that an axial distance between a front of the extension ring and the cover plate can be adjusted to accommodate structures of different thicknesses; and a pair of tabs extending laterally from the extension ring, each tab of the pair of tabs defining a proximal opening and a distal opening for mounting an electrical device to the extension ring, a first line segment connects centers of the proximal openings of the pair of tabs and a second line segment connects centers of the distal openings of the pair of tabs, wherein the second line segment is greater than the first line segment.

\* \* \* \* \*